(12) United States Patent
Engheta et al.

(10) Patent No.: US 7,218,190 B2
(45) Date of Patent: May 15, 2007

(54) WAVEGUIDES AND SCATTERING DEVICES INCORPORATING EPSILON-NEGATIVE AND/OR MU-NEGATIVE SLABS

(75) Inventors: Nader Engheta, Wayne, PA (US); Andrea Alù, Rome (IT)

(73) Assignee: The Trustees of the University of Pennsylvania, Philadelphia, PA (US)

(*) Notice: Subject to any disclaimer, the term of this patent is extended or adjusted under 35 U.S.C. 154(b) by 304 days.

(21) Appl. No.: 10/859,422

(22) Filed: Jun. 2, 2004

(65) Prior Publication Data

US 2005/0031295 A1    Feb. 10, 2005

Related U.S. Application Data

(60) Provisional application No. 60/475,028, filed on Jun. 2, 2003, provisional application No. 60/474,976, filed on Jun. 2, 2003.

(51) Int. Cl.
*H01P 3/00* (2006.01)
*H01P 1/00* (2006.01)

(52) U.S. Cl. .................. 333/239; 333/242; 333/248

(58) Field of Classification Search ............... 333/239, 333/242, 248
See application file for complete search history.

(56) References Cited

OTHER PUBLICATIONS

Wiltshire et al WO 03/044897 A1.*
Alù, A., et al., "Radiation from a traveling-wave current sheet at the interface between a conventional material and a material with negative permittivity and permeability," *Microwave and Opt. Tech. Lett.*, 2002,35(6), 460-463.

Alù, A., et al., "Anomalous mode coupling in guided-wave structures containing metamaterials with negative permittivity and permeability," a talk at the *2002 IEEE Nanotechnology Conference*, 2002, 233-234.

Alù, A., et al., "Mode excitation by a line source in a parallel-plate waveguide filled with a pair of parallel double-negative and double-positive slabs," to appear in the *2003 IEEE AP-S Int. Symp*, in Jun. 22-27, 2003.

Alù, A., et al., "Pairing an epsilon-negative slab with a mu-negative slab: resonance, tunneling and transparency," *IEEE Trans. On Antennas and Propagation*, 2003, 51(10), 2558-2571.

Alù, A., et al., "Mono-modal waveguides filled with a pair of parallel epsilon-negative (ENG) and mu-negative (MNG) metamaterial layers," *Digest of IEEE MIT Int. Microwave Symp.* (IMS'03), 2003, 313-316.

(Continued)

*Primary Examiner*—Robert Pascal
*Assistant Examiner*—Kimberly E Glenn
(74) *Attorney, Agent, or Firm*—Woodcock Washburn LLP

(57) ABSTRACT

Waveguides and scattering devices are made from a pair of slabs, at least one slab being either an "epsilon-negative (ENG)" layer in which the real part of permittivity is assumed to be negative while its permeability has positive real part, or a "mu-negative (MNG)" layer that has the real part of its permeability negative but its permittivity has positive real part. The juxtaposition and pairing of such ENG and MNG slabs under certain conditions lead to some unusual features, such as resonance, complete tunneling, zero reflection and transparency. Such materials also may be configured to provide guided modes in a waveguide having special features such as mono-modality in thick waveguides and the presence of TE modes with no cut-off thickness in thin parallel-plate waveguides. Using equivalent transmission-line models, the conditions for the resonance, complete tunneling and transparency are described as well as the field behavior in these resonant paired structures. A "matched" lossless ENG-MNG pair is configured to provide "ideal" image displacement and image reconstruction.

10 Claims, 18 Drawing Sheets

OTHER PUBLICATIONS

Alù, A., et al., "Guided modes in a waveguide filed with a pair of single-negative (SNG), double-negative (DNG), and/or double-positive (DPS) layers," to appear in *IEEE Transactions on Microwave theory and Techniques*, 2004, 1-14.

Balmain, K.G., et al., "Resonance cone formation, reflection, refraction and focusing in a planar anisotropic metamaterial," *IEEE Antennas and Wireless Propagation Lett.*, 2002, 1, 146-149.

Caloz, C., et al., "Transmission line approach of left-handed materials," *2002 IeEE AP-S Int. Symp./USNC/URSI National Radio Science Meeting*, 2002, URSI session, Abstract on p. 39.

Caloz, C., et al., "Full-wave verification of the fundamental properties of left-handed materials in waveguide configuration," *J. of Appl. Phys.*, 2001, 90(II), 5483-5486.

Eleftheriades, G.V., et al., "Planar negative refractive index media using periodically L-C loaded transmission lines," *IEEE Trans. Microwave Theory Tech.*, 2002, 50(12), 2702-2712.

Engheta, N., "Guided waves in paired dielectric-metamaterial with negative permittivity and permeability layers," a talk presented at the *USNC-URSI National Radio Science Meeting*, 2002, Abstract in p. 66.

Engheta, N., "Ideas for potential applications of metamaterials with negative permittivity and permeability," a chapter in *Advances in Electromagnetics of Complex Media and Metamaterials, NATO Science Series,* Zouhdi, S., et al. (Eds.), Kluwer Academic Publishers, 2002, 19-37.

Engheta, N., et al., "Distributed-circuit-element description of guided-wave structures and cavities involving double-negative or single-negative media," *Proc. SPIE: Complex Mediums IV: beyond Linear Isotropic Dielectrics*, 2003, 5281, 145-155.

Ehgheta, N., "An idea for thin subwavelength cavity resonators using metamaterials with negative permittivity and permeability," *IEEE Antennas and Wireless Propagation Letters*, 2002, 1, 10-13.

Feise, M.W., et al., "Effects of surface waves on behavior of perfect lenses," *Phys. Rev. B.*, 2002, 66, 035113.

Fredkin, et al., "Effective left-handed (negative index) composite material," *Appl. Phys. Lett*, 2002, 81(10), 1753-1755.

Garcia, N., et al., "Left-handed materials do not make a perfect lens," *Phys. Rev. Lett.*, 2002, 88(20), 207403.

Gay-Balmaz, P., et al., "Efficient isotropic magnetic resonators," *Appl. Phys. Lett.*, 2002, 81(5), 939-941.

Grbic, A., et al., "A backward-wave antenna based on negative refractive index L-C networks," *2002 IEEE AP-S Int. Symp/USNC/URSI National Radio Science Meeting*, 2002, vol. 4 of AP Digest, 340-343.

Hrabar, Z., et al., "Capacitively loaded loop as basic element of negative permeability meta-material," *32nd European Microwave Conference*, 2002, 4 pages.

Kong, J.A., et al., "A unique lateral displacement of a Gaussian beam transmitted through a slab with negative permittivity and permeability," *Microwave and Opt. Tech. Lett.*, 2002, 33(2), 136-139.

Lagarkov, A.N., et al., "Electrodynamics properties of simple bodies made of materials with negative permeability and negative permittibity," *Doklady Physics.*, 2001, 46(3), 163-165 (translated from *Doklady Akademii Nauk*, 2001, 377(1), 40-43).

Lakhtakia, A., "Reversed circular dichroism of isotropic chiral mediums with negative permeability and permittivity," *Microwave and Opt. Tech. Lett.*, 2002, 33(2), 96-97.

Lindell, et al., "BW media—media with negative parameters, capable of supporting backward waves," *Microwave and Opt. Tech. Lett.*, 2001, 31(2), 129-133.

Liu, L., et al., "Forward coupling phenomena between artificial left-handed transmission lines," *J. of Appl. Phys.-*, 2002, 92(9), 5560-5565.

Marques, R., et al., "Role of bianisotropy in negative permeability and left-handed metamaterials," *Phys. Rev. B.*, 2002, 65(14), 144440.

Marques, R., et al., "A new 2-D isotropic left-handed metamaterial design: theory and experiment," *Microwave and Opt. Tech. Lett.*, 2002, 36, 405-408.

McCall, M.W., et al., "The negative index of refraction demystified," *European J. of Phys.*, 2002, 23, 353-359.

Nefedov, I.S., et al., "Waveguide containing a backward-wave slab," *e-print in arXiv:cond-mat/0211185v1*, at http://arxiv.org/pdf/cond-mat/0211185, 2002, 1-11.

Nefedov, I.S., "Theoretical study of waveguiding structures containing backward-wave materials," in the *XXVII General Assembly of International Union of Radio Science* (URSI GA'02), 2002, paper No. 1074 in the CD Digest, 4 pages.

Papas, C.H., Theory of Electromagnetic Wave Propagation, *Dover Pub., Chap. 6*, 1988, 169-215.

Pendry, et al., "Low-frequency plasmons in thin wire structures," *J. of Physics: Condensed Matter*, 1998, 10, 4785-4809.

Pendry, et al., "Magnetism for conductors and enhanced nonlinear phenomena," *IEEE Trans. Microwave Theory Tech.*, 1999, 47(11), 2075-2081.

Pendry, J.B., "Negative refaction makes a perfect lens," *Phys. Rev. Lett.*, 2000, 85(18), 3966-3969.

Shelby, et al., "Experimental verification of a negative index of refraction," *Science*, 2001, 292(5514), 77-79.

Shelby, R.A., et al., "Microwave transmission through a two-dimensional, isotropic, left-handed metamaterial," *Appl. Phys. Lett.*, 2001, 78(4), 489-491.

Silin, R.A., et al., "On media with negative dispersion," *J. of Communication Tech. and Electronics*, 2001, 46(10), 1121-1125 (translated from *Radiotekhnika*, 2001, 46(10), 1212-1217).

Smith, D.R., et al., "Composite medium with simultaneously negative permeability and permittivity," *Phys. Rev. Lett.*, 2000, 84(18), 4184-4187.

Smith, D.R., et al., "Negative refraction of modulated electromagnetic waves," *Appl. Phys. Lett.*, 2002, 81(15), 2713-2715.

Topa, A., "Contra-directional interaction in a NRD waveguide coupler with a metamaterial slab," in the *XXVII General Assembly of International Union of Radio Science* (URSI GA '02), 2002, paper No. 1878 in the CD Digest, 4 pages.

Tretyakov, S.A., "Metamaterials with wideband negative permittivity and permeability," *Microwave and Opt. Tech. Lett.*, 2001, 31(3), 163-165.

Valanju, P.M., et al., "Wave refraction in negative-index media: always positive and very inhomogeneous," *Phys. Rev. Lett.*, 2002, 88(18), 187401-1-187401-4.

Veselago, V.G., "The electrodynamics of substances with simultaneously negative values of $\epsilon$ and $\mu$," *Solviet Physics Uspekhi*, 1968, 10(4), 509-514 (in Russian Usp. Fiz. Nauk, 1967, 92, 517-526).

Zhang, Z.M., et al., "Unusual photon tunneling in the presence of a layer with a negative refractive index," *Appl. Phys. Lett.*, 2002, 80(6), 1097-1099.

Ziolkowski, R.W., et al., "Wave propagation in media having negative permittivity and permeability," *Phys. Rev. E.*, 2001, 64(5), 056625-1-056625-15.

Ziolkowski, R.W., "Superluminal transmission of information through en electromagnetic metamaterials," *Phys. Rev. E.*, 2001, 63(4), 046604-1-046604-13.

Ziolkowski, R.W., "Pulsed and CW Gaussian beam interactions with double negative metamaterial slabs," *Opt. Express*, 2003, 11(7), 662-681, http://www.opticsexpress.org/abstract.cfm?URI=OPEX-11-7-662.

Ziolkowski, R.W., "Tailoring the electromagnetic responses of metamaterials: double negative metamaterial designs and experiments," a talk at the *2002 IEEE-Nanotechnology Conference*, 2002.

\* cited by examiner a)

b)

a)

b)

a)

b)

WAVEGUIDES AND SCATTERING DEVICES INCORPORATING EPSILON-NEGATIVE AND/OR MU-NEGATIVE SLABS

CROSS-REFERENCE TO RELATED APPLICATIONS

The present patent application claims priority from U.S. Provisional Patent Application Nos. 60/474,976, filed Jun. 2, 2003, and 60/475,028, filed Jun. 2, 2003. The contents of these patent applications are hereby incorporated by reference in their entireties.

FIELD OF THE INVENTION

The present invention relates to waveguides and scattering devices made from multiple layers of electromagnetic complex materials with at least one material having negative real permittivity or negative real permeability.

BACKGROUND OF THE INVENTION

In 1967, Veselago postulated theoretically an electromagnetic complex material in which both permittivity and permeability were assumed to have negative real values, and he analyzed plane wave propagation in such a medium, which he called a "left-handed (LH)" medium [V. G. Veselago, "The electrodynamics of substances with simultaneously negative values of $\epsilon$ and $\mu$," Soviet Physics Uspekhi, Vol. 10, No. 4, pp. 509–514, 1968 (in Russian Usp. Fiz. Nauk, Vol. 92, pp. 517–526, 1967]. According to Veselago's analysis, in such a "double-negative (DNG)" material [R. W. Ziolkowski, and E. Heyman, "Wave propagation in media having negative permittivity and permeability," Phys. Rev. E., Vol. 64, No. 5, 056625, 2001], the Poynting vector of a plane wave is antiparallel with its phase velocity. In recent years, Shelby et al. in an article entitled "Experimental verification of a negative index of refraction," Science, vol. 292, no. 5514, pp. 77–79, 2001, inspired by the work of Pendry et al. in articles entitled "Magnetism from conductors and enhanced nonlinear phenomena," IEEE Trans. Microwave Theory Tech, Vol. 47, No. 11, pp. 2075–2081, November 1999, and "Low-frequency plasmons in thin wire structures," J. of Physics: Condensed Matter, Vol. 10, pp. 4785–4809, 1998, reported the construction of a composite medium in the microwave regime by arranging arrays of small metallic wires and split ring resonators. The anomalous refraction for this medium was demonstrated in the afore-mentioned Shelby et al. article and in the following articles: D. R. Smith, et al., "Composite medium with simultaneously negative permeability and permittivity," Phys. Rev. Lett., Vol 84, No. 18, pp. 4184–4187, 2000; and R. A. Shelby, et al., "Microwave transmission through a two-dimensional, isotropic, left-handed metamaterial," Appl. Phys. Lett., Vol. 78, No. 4, pp. 489–491, 2001. Various aspects of this class of metamaterials are now being studied by several groups worldwide, and many ideas and suggestions for potential applications of these media have been mentioned.

For example, the present inventors have suggested the possibility of having thin, sub-wavelength cavity resonators in which a layer of the "double-negative" (DNG) medium is paired with a layer of conventional material (i.e., a "double-positive (DPS)" medium) in articles entitled: N. Engheta, "An idea for thin subwavelength cavity resonators using metamaterials with negative permittivity and permeability," IEEE Antennas and Wireless Propagation Lett., Vol. 1, No. 1, pp. 10–13, 2002; N. Engheta, "Guided waves in paired dielectric-metamaterial with negative permittivity and permeability layers" URSI Digest, USNC-URSI National Radio Science Meeting, Boulder, Colo., Jan. 9–12, 2002, p. 66; and N. Engheta, "Ideas for potential applications of metamaterials with negative permittivity and permeability," Advances in Electromagnetics of Complex Media and Metamaterials, NATO Science Series, (editors S. Zouhdi, A. H. Sihvola, M. Arsalane), Kluwer Academic Publishers, pp. 19–37, 2002. As explained in these articles, theoretical results have revealed that a slab of DNG metamaterial can act as a phase compensator/conjugator. Thus, by combining such a slab with another slab made of a conventional dielectric material one can, in principle, have a 1-D cavity resonator whose dispersion relation does not depend on the sum of thicknesses of the interior materials filling this cavity, but instead it depends on the ratio of these thicknesses. The inventors later extended this work to the analyses of parallel-plate waveguides containing a pair of DPS and DNG layers, guided modes in open DNG slab waveguides, and mode coupling between open DNG and DPS slab waveguides. In each of these problems, the inventors found that when a DNG layer is combined with, or is in proximity of, a DPS layer interesting and unusual properties are observed for wave propagation within this structure. Indeed, the paired DNG-DPS bilayer structures were found to exhibit even more interesting properties than a single DNG or DPS slab—properties that are unique to the wave interaction between the DNG and DPS layers.

By exploiting the anti-parallel nature of the phase velocity and Poynting vectors in a DNG slab, the present inventors theoretically found the possibility of resonant modes in electrically thin parallel-plate structures containing such DNG-DPS bilayer structures. Following those works, a first set of preliminary results and ideas for the guided modes in a parallel-plate waveguide containing a pair of DNG and DPS slabs was presented by the present inventors. Later, in an article entitled "Anomalous mode coupling in guided-wave structures containing metamaterials with negative permittivity and permeability," Proc. 2002 IEEE-Nanotechnology, Washington D.C., Aug. 26–28, 2002, pp. 233–234., the present inventors showed the effects of the anomalous mode coupling between DNG and DPS open waveguides located parallel to, and in proximity of, each other. Some other research groups have also explored certain aspects of waveguides involving DNG media.

Most of the work in the area of metamaterials reported in the recent literature has so far been concerned with the wave interaction with DNG media, either by themselves or in juxtaposition with conventional (DPS) media. However, as will be explained in more detail below, the present inventors have now recognized that "single-negative (SNG)" materials in which only one of the material parameters, not both, has a negative real value may also possess interesting properties when they are paired in a conjugate manner. These media include the epsilon-negative (ENG) media, in which the real part of permittivity is negative but the real permeability is positive, and the mu-negative (MNG) media, in which the real part of permeability is negative but the real permittivity is positive. For instance, the idea of using such a combination to provide an effective group velocity that would be antiparallel with the effective phase velocity, and thus acting as an effective left-handed (LH) medium has been explored by Fredkin et al. in "Effective left-handed (negative index) composite material," Appl. Phys. Lett., Vol. 81, No. 10, pp. 1753–1755, 2 Sept. 2002.

The present application addresses the characteristics of ENG-MNG bilayer structures, such characteristics including resonance, complete tunneling, transparency, and guided modes. Such bilayer structures are the subject of the present invention.

SUMMARY OF THE INVENTION

The present invention provides devices such as waveguides filled with pairs of parallel or concentric layers where the first layer is made up of either (a) a material with negative real permittivity but positive real permeability (ENG) or (b) a material with negative real permeability but positive real permittivity (MNG) and where the second layer is made up of either (c) a material with both negative real permittivity and permeability (DNG), (d) a conventional material with both positive real permittivity and permeability (DPS), or the ENG or MNG material not used in the first layer, in a given range of frequency. Waveguides in accordance with the invention have special features such as mono-modality in thick waveguides and the presence of transverse electric (TE) modes with no cut-off thickness in thin parallel-plate waveguides. On the other hand, scattering devices in accordance with the invention recognize the transverse magnetic (TM) or transverse electric (TE) wave interaction with a pair of ENG-MNG slabs and juxtapose and pair such ENG and MNG slabs so as to lead to some unusual features such as resonance, zero reflection, complete tunneling and transparency. The invention takes note of the field distributions inside and outside such paired slabs, including the reflection and transmission from this pair, and the flow of the Poynting vector in such structures when the zero-reflection conditions are satisfied. The equivalent transmission-line models with appropriate distributed series and shunt reactive elements are derived and applied in order to derive the necessary and sufficient conditions for zero reflection, resonance, complete tunneling and transparency, and to explain the seemingly anomalous field behavior in these paired structures. The invention particularly illustrates that pairing the ENG and MNG slabs may exhibit resonance phenomenon, and that such a resonance is one of the reasons behind the transparency for these paired slabs and the unusual field behavior within them. Furthermore, the inventors have discussed several characteristics of the tunneling conditions, such as the roles of the material parameters, slab thicknesses, dissipation, and angle of incidence. Finally, as a potential application of the conjugate matched lossless pair of ENG-MNG slabs, the inventors have proposed an idea for an "ideal" image displacement and image reconstruction utilizing such a pair.

BRIEF DESCRIPTION OF THE DRAWINGS

The characteristic features of the present invention will be apparent from the following detailed description of the invention taken in conjunction with the accompanying drawings, of which:

FIG. 9b illustrates the real and imaginary parts of the normalized transverse magnetic field $H_y$ as a function of z coordinate when a normally incident TM wave illuminates a sample pair of lossless MNG-ENG slabs reversed in position from FIG. 9a.

DETAILED DESCRIPTION OF ILLUSTRATIVE EMBODIMENTS

Figure 1A:
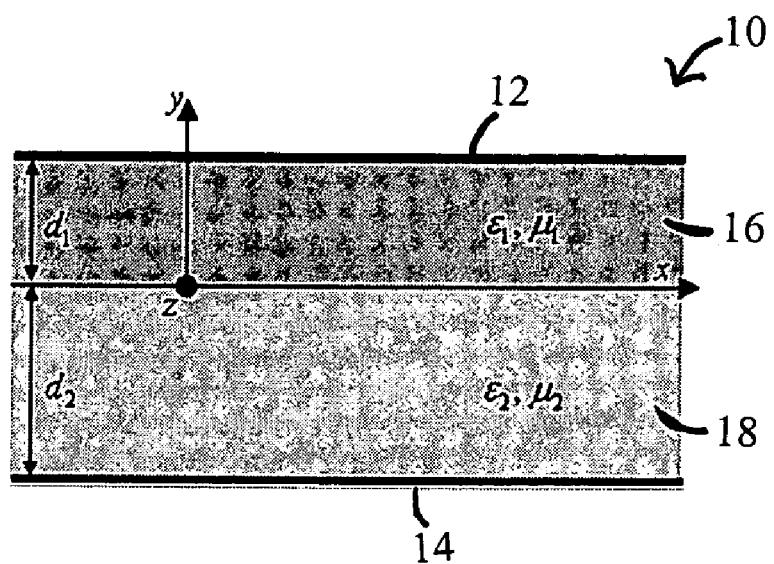
FIG. 1a illustrates the geometry of a parallel-plate waveguide filled with a pair of layers made of any two of epsilon-negative (ENG), mu-negative (MNG), double-negative (DNG), and double-positive (DPS) materials in accordance with the invention.

The invention will be described in detail below with reference to FIGS. 1–18. Those skilled in the art will appreciate that the description given herein with respect to those figures is for exemplary purposes only and is not intended in any way to limit the scope of the invention. All questions regarding the scope of the invention may be resolved by referring to the appended claims.

Overview

Generally speaking, the present invention relates to devices and components made of adjacent slabs of materials, at least one of which is a material with a negative real permittivity or permeability. As noted above, methods have been suggested in the prior art for constructing particulate composite media in which the real part of permittivity can attain negative values in a certain frequency range. Likewise, techniques have been studied for forming passive complex media with negative real permeability in a given frequency band. To form a medium with both real permittivity and permeability being negative, one has to combine both fabrication techniques, as described in the aforementioned articles to Shelby et al. and Smith et al. However, constructing waveguide or scattering components from two slabs of materials, each with only one of the material parameters having a negative real part in accordance with the invention, is not suggested by such prior art. Such is the subject matter of the present invention.

As for the terminology, for a medium with negative real permittivity (and positive real permeability), the inventors use the term "epsilon-negative (ENG)" medium, while for the medium with negative real permeability (and positive real permittivity) the inventors choose the term "mu-negative (MNG)" medium. These are indeed media with "single-negative (SNG)" parameter, as opposed to "double-negative (DNG)" media. In most of the analysis, the media are assumed to be lossless. However, when dissipation is considered, the complex parameters $\epsilon = \epsilon_0(\epsilon_r - j\epsilon_i)$ and $\mu = \mu_0(\mu_r - j\mu_i)$ are used where $\epsilon_i$ and $\mu_i$ are non-negative quantities for passive media for the time dependence $e^{j\omega t}$. The inventors also consider loss to be relatively small, i.e., $\epsilon_i \ll |\epsilon_r|$ and $\mu_i \ll |\mu_r|$. Finally, where the following description discusses only the transverse magnetic (TM) polarization case, those skilled in the art will appreciate that similar features and results are obtained for the transverse electric (TE) case, and vice-versa, by using the duality principle.

As will be explained herein, the present inventors contemplate that the invention may be used in the microwave and optical (visible) regimes. Those skilled in the art will appreciate that techniques for manufacturing and constructing the devices described herein may be different for the different frequency regimes. It is believed that those skilled in the art will apply the appropriate techniques depending upon the frequency regime of interest.

Conventional double-positive materials such as glass (visible frequency range) and quartz (microwave frequency range) are, of course, well-known. DNG materials are not as widely known, particularly in the visible frequency range. For a description of sample DNG materials in the microwave regime, see Shelby et al., "Experimental Verification of a Negative Index of Refraction," *Science, Vol.* 292, No. 5514, pp. 77–79, 2001, and Smith et al, "Composite Medium with Simultaneously Negative Permeability and Permittivity," *Phys. Rev. Lett.*, Vol. 84, No. 18, pp. 4184–4187, 2000. The contents of these references are hereby incorporated by reference in their entireties. Sample ENG materials in the optical (visible) frequency regime are well-known to those skilled in the art. For example, silver, gold, and plasmonic materials have ENG characteristics in the visible frequency range. Artificial materials with ENG characteristics in the microwave frequency regime are also known to those skilled in the art. For example, see Pendry et al., "Low-Frequency Plasmons in Thin Wire Structures," *J. of Physics: Condense Matter*, Vol. 10, pp. 4785–4809, 1998. The contents of this reference is hereby incorporated by reference in its entirety. On the other hand, sample MNG materials in the optical (visible) frequency regime are difficult because if one wants to scale down the "wire and loop" inclusion to the visible wavelength scale, the loss will be prohibitively large. However, artificial materials with MNG characteristics in the microwave frequency regime are known to those skilled in the art. For example, see Pendry, et al., "Magnetism from Conductors and Enhanced Nonlinear Phenomena," *IEEE Trans. Microwave Theory Tech.*, Vol. 47, No. 11, pp. 2075–2081, November 1999. As will be explained in more detail below, the present inventors have analyzed in detail the wave interaction with a pair of juxtaposed ENG and MNG slabs, showing interesting properties such as resonances, transparency, anomalous tunneling, and zero reflection. Using appropriate distributed circuit elements in the transmission-line model for the pair of ENG-MNG layers, the inventors will explain below the unusual field behavior in these paired ENG-MNG structures and show that such lossless pairs may exhibit "interface resonance" phenomena, even though each slab alone does not manifest such an effect. Based on the following description, those skilled in the art will appreciate that suitably coupled SNG media may offer exciting possibilities in the design of waveguide and scattering devices and components. Since only one of their parameters needs to be negative in a given frequency range, they may be constructed more easily than DNG media, for which both parameters should possess negative real parts in a given band of frequencies. For instance, a collisionless isotropic plasma, whose permittivity may be negative at frequencies below the plasma frequency may be shown to be an ENG medium at those frequencies.

The description below also includes an analysis of parallel-plate (FIG. 1a) or concentric (FIG. 1b) wave-guiding structures filled with pairs of layers made of any two of ENG, MNG, DPS, and DNG materials used to explore possible unconventional features that depend on the choice of the constitutive parameters. In the analysis herein, these materials are assumed to be lossless, homogeneous, and isotropic. It will be shown that by juxtaposing "conjugate" materials, i.e. materials with complementary electromagnetic properties, unusual features may be achieved in such guiding structures. For example, the possibility of monomodal propagation in arbitrarily thick parallel-plate waveguides filled with a pair of ENG-MNG layers and modes with no cut-off thickness is highlighted. Although the structures considered herein are parallel-plate or concentric waveguides filled with SNG, DNG, and DPS media, those skilled in the art will appreciate that their features may provide physical insights into ideas and characteristics for other waveguide geometries filled with such metamaterials, with applications in the design of waveguide and scattering devices and components.

Also, it is important to note that passive SNG and DNG metamaterials, in which permittivity and/or permeability may have negative real parts, are inherently dispersive. Therefore, for passive metamaterials, the real parts of the material parameters may be negative only over a certain band of frequencies, and thus their values may significantly vary with the frequency. As a result, one should in general take into account the frequency dependence of such material parameters. However, in order to emphasize the salient features of this type of waveguide without resorting to an unnecessary complexity, the frequency of operation $\omega$ is fixed for purposes of the description herein and the values of permittivity and permeability of SNG, DNG, and DPS materials are considered to be given at this given frequency. All other parameters of the waveguide such as layer thicknesses and longitudinal wave numbers may arbitrarily vary.

I. Guided Modes in Waveguides with at Least One SNG Layer

A. Geometry

Consider a parallel-plate waveguide 10, made of two infinitely extending perfect electrically conducting plates 12, 14 separated by the distance $d=d_1+d_2$, as shown in FIG. 1a. This waveguide is filled with a pair of parallel layers 16, 18 where the first layer is made up of ENG or MNG material and the second layer is made up of DNG material, DPS material, or the SNG material not used in the first layer. A monochromatic time-harmonic variation $e^{j\omega t}$ is assumed. The two slabs 16, 18 are characterized by their thicknesses $d_1$ and $d_2$, and constitutive parameters $\epsilon_1$, $\mu_1$, and $\epsilon_2$, $\mu_2$, respectively, which are assumed real, but no assumption on their signs has yet been made. The Cartesian coordinate system (x,y,z) is shown in FIGS. 1a and $x$ is chosen as the direction of propagation of guided modes.

Imposing appropriate boundary conditions at $y=d_1$ and $y=-d_2$, the electric and magnetic field expressions for the $TE^x$ mode may be written as:

$$E^{TE} = \hat{z}E_0^{TE}e^{-j\beta_{TE}x} \cdot \begin{cases} \sin(k_{t2}^{TE}d_2)\sin[k_{t1}^{TE}(d_1 - y)] & y > 0 \\ \sin(k_{t1}^{TE}d_1)\sin[k_{t2}^{TE}(y + d_2)] & y < 0 \end{cases} \quad (1)$$

$$H^{TE} = \hat{jx}\omega^{-1}E_0^{TE}e^{-j\beta_{TE}x} \cdot \begin{cases} -\mu_1^{-1}k_{t1}^{TE}\sin(k_{t2}^{TE}d_2)\cos[k_{t1}^{TE}(d_1 - y)] + \\ \mu_2^{-1}k_{t2}^{TE}\sin(k_{t1}^{TE}d_1)\cos[k_{t2}^{TE}(y + d_2)] \end{cases}, \quad (2)$$

$$-\hat{y}\omega^{-1}\beta_{TE}E_0^{TE}e^{-j\beta_{TE}x} \cdot \begin{cases} \mu_1^{-1}\sin(k_{t2}^{TE}d_2)\sin[k_{t1}^{TE}(d_1 - y)] & y > 0 \\ \mu_2^{-1}\sin(k_{t1}^{TE}d_1)\sin[k_{t2}^{TE}(y + d_2)] & y < 0 \end{cases}$$

where $E_0^{TE}$ is the mode amplitude, determined by the excitation, and $k_{ti}^{TE} = \sqrt{k_i^2 - \beta_{TE}^2}$ with $k_i^2 = \omega^2\mu_i\epsilon_i$ for i=1, 2. The corresponding expressions for the $TM^x$ modes may be easily obtained (not shown here). For ENG and MNG slabs, where one of the material parameters is negative, $k_i^2<0$, and for propagating modes with real $\beta$, the transverse wave number $k_{ti}$ is always imaginary. However, for DPS and DNG slabs, $k_i^2>0$ and the transverse wave number $k_{ti}$ may be real or imaginary, depending on the value of $\beta$. The field expressions in (1) and (2) and the corresponding expressions for the TM case remain valid for any of these cases. (For simplicity, the superscript 'x' in $TE^x$ and $TM^x$ will be dropped hereafter.) By applying the boundary conditions for the tangential components of the electric and magnetic fields at the interface y=0, one finds the following two dispersion relations for the TE and TM modes, respectively:

$$\frac{\mu_1}{k_{t1}^{TE}}\tan(k_{t1}^{TE}d_1) = -\frac{\mu_2}{k_{t2}^{TE}}\tan(k_{t2}^{TE}d_2) \quad (3)$$

-continued $$\frac{\varepsilon_1}{k_{t1}^{TM}}\cot(k_{t1}^{TM}d_1) = -\frac{\varepsilon_2}{k_{t2}^{TM}}\cot(k_{t2}^{TM}d_2). \quad (4)$$

Depending on the choice of material parameters, the above dispersion relations reveal interesting characteristics for the guided modes present in this waveguide. Some of the features of propagating guided modes for various pairs of ENG, MNG, DPS, and/or DNG slabs filling this guiding structure in accordance with the invention will be explained below.

B. Pairs of SNG Slabs: ENG-MNG, ENG-ENG, and MNG-MNG Pairs

For a pair of ENG and MNG slabs, $\varepsilon_1 < 0$, $\mu_1 > 0$, $\varepsilon_2 > 0$, and $\mu_2 < 0$, and thus $k_1^2 = \omega^2 \mu_1 \varepsilon_1 < 0$ and $k_2^2 = \omega^2 \mu_2 \varepsilon_2 < 0$. For propagating modes, $\beta_{TE}$ and $\beta_{TM}$ should be real-valued quantities, and thus $k_{ti} = j\sqrt{|k_i|^2 + \beta^2}$ is purely imaginary for $i=1, 2$. The dispersion relations (3) and (4) above for the TE and TM modes can then be rewritten, respectively, as:

$$\frac{\mu_1}{\sqrt{|k_1|^2 + \beta_{TE}^2}}\tanh\left(\sqrt{|k_1|^2 + \beta_{TE}^2}\, d_1\right) = \quad (5)$$

$$-\frac{\mu_2}{\sqrt{|k_2|^2 + \beta_{TE}^2}}\tanh\left(\sqrt{|k_2|^2 + \beta_{TE}^2}\, d_2\right)$$

$$\frac{\varepsilon_1}{\sqrt{|k_1|^2 + \beta_{TM}^2}}\coth\left(\sqrt{|k_1|^2 + \beta_{TM}^2}\, d_1\right) = \quad (6)$$

$$-\frac{\varepsilon_2}{\sqrt{|k_2|^2 + \beta_{TM}^2}}\coth\left(\sqrt{|k_2|^2 + \beta_{TM}^2}\, d_2\right).$$

For the case where one slab is a lossless ENG and the other is a lossless MNG, the goal is to find the conditions under which one may obtain real-valued solutions for the longitudinal wave number $\beta$. Due to the monotonic behavior and the asymptotic limit of the hyperbolic tangent and cotangent functions with real argument in (5) and (6), one expects to observe interesting dispersion characteristics. First, because (5) and (6) are indeed valid for any pair of SNG materials, if $\mu_1$ and $\mu_2$ have the same sign, (5) may not have any real-valued solution for $\beta_{TE}$. Likewise, if $\varepsilon_1$ and $\varepsilon_2$ have the same sign, there may not be any TM mode with real $\beta_{TM}$ from (6). This is not surprising, since for the case of the ENG-ENG pair or the MNG-MNG pair, where permittivities and permeabilities have the same signs, i.e., $\varepsilon_1\varepsilon_2 > 0$ and $\mu_1\mu_2 > 0$, the wave number in the bulk paired materials is always imaginary. However, when one has a so-called "conjugate" pair, i.e., a pair of ENG and MNG slabs in this waveguide, both sides of (5) and (6) have the same sign, and thus it is possible to have real-valued solutions for $\beta_{TE}$ and $\beta_{TM}$.

In order to gain some physical insights into the possible real-valued solutions of (5) and (6), one may assume that for a given set of material parameters for the two slabs, the thickness of the ENG slab $d_1$ is known and fixed, and one may find the MNG slab thickness $d_2$ such that $\beta$ attains a specific real value. This can be found by rearranging (5) and (6) as:

$$d_2^{TE} = \frac{\tanh^{-1}\left[\frac{|\mu_1|\sqrt{|k_2|^2+\beta_{TE}^2}}{|\mu_2|\sqrt{|k_1|^2+\beta_{TE}^2}}\tanh\left(\sqrt{|k_1|^2+\beta_{TE}^2}\,d_1\right)\right]}{\sqrt{|k_2|^2+\beta_{TE}^2}} \quad (7)$$

$$d_2^{TM} = \frac{\tanh^{-1}\left[\frac{|\varepsilon_2|\sqrt{|k_1|^2+\beta_{TM}^2}}{|\varepsilon_1|\sqrt{|k_2|^2+\beta_{TM}^2}}\tanh\left(\sqrt{|k_1|^2+\beta_{TM}^2}\,d_1\right)\right]}{\sqrt{|k_2|^2+\beta_{TM}^2}}, \quad (8)$$

A physical solution for $d_2$ exists only if the argument of the inverse hyperbolic tangent function in the above equations is between zero and unity, which suggests that not for every arbitrary pair of $d_1$ and $\beta$ one will be able to find a solution for $d_2$. But when this condition is fulfilled, the solution for $d_2$ is unique due to the monotonic (non-periodic) behavior of the hyperbolic tangent function. Specifically, for a given set of parameters for the pair of ENG and MNG slabs and a fixed $d_1$, there may only be one value for $d_2^{TE}$ when a given real value for $\beta_{TE}$ is desired, and similarly there may only be one value for $d_2^{TM}$ when $\beta_{TM}$ is given. These features are in contrast with those of propagating modes in a conventional waveguide filled with a pair of DPS-DPS slabs, where one has multiple solutions for $d_2$ due to the periodic behavior of the fields in the transverse section. Furthermore, in the ENG-MNG waveguide the field components vary as hyperbolic sinusoidal functions in the transverse plane, and they are mostly concentrated around the ENG-MNG interface. As will be shown below, similar field distributions and concentration near the interface may be observed in DPS-DNG waveguides when $\beta > \max(|k_1|,|k_2|)$, as also observed by Nefedov and Tretyakov in an article entitled "Waveguide containing a backward-wave slab," e-print in arXiv:cond-mat/0211185 v1, at http://arxiv.org/pdf/cond-mat/0211185, 10 Nov. 2002. As will be noted below, there are other interesting properties in the DPS-DNG waveguides that may resemble those of the ENG-MNG waveguides discussed here.

The conditions for having the arguments of the inverse hyperbolic tangent functions in (7) and (8) less than unity may be explicitly given as:

$$\tanh\left(\sqrt{\beta_{TE}^2+|k_1|^2}\,d_1^{TE}\right) < \frac{|\mu_2|\sqrt{\beta_{TE}^2+|k_1|^2}}{|\mu_1|\sqrt{\beta_{TE}^2+|k_2|^2}} \quad (9)$$

$$\tanh\left(\sqrt{\beta_{TM}^2+|k_1|^2}\,d_1^{TM}\right) < \frac{|\varepsilon_1|\sqrt{\beta_{TM}^2+|k_2|^2}}{|\varepsilon_2|\sqrt{\beta_{TM}^2+|k_1|^2}}. \quad (10)$$

If the terms on the right-hand side of (9) and (10) are greater than unity, then any values of $d_1^{TE}$ and $d_1^{TM}$, no matter how large or small, may satisfy these inequalities. However, if the right-hand terms are less than unity, then only certain limited ranges of $d_1^{TE}$ and $d_1^{TM}$ may fulfill (9) and (10). It is interesting to note that, due to the symmetric nature of the dispersion relations, when $d_1$ is limited to a finite range, $d_2$ will have a unique solution between zero and infinity, and vice versa, if $d_2$ is limited, then $d_1$ may find a unique solution in that infinite range. In other words, for any given $\beta$ (for TE or TM) only one of the two corresponding thicknesses $d_1$ and $d_2$ may be confined to a finite range of variation.

One special case, namely when the right-hand side of (9) or (10) becomes unity, deserves particular attention, since in such a case neither $d_1$ nor $d_2$ is limited to a finite range of variation. The values of $\beta$ that may provide this special condition is explicitly given by:

$$\beta_{sw}^{TE} = \pm \omega \sqrt{\frac{\varepsilon_1/\mu_1 - \varepsilon_2/\mu_2}{\mu_1^{-2} - \mu_2^{-2}}} \quad (11)$$

$$\beta_{sw}^{TM} = \pm \omega \sqrt{\frac{\mu_1/\varepsilon_1 - \mu_2/\varepsilon_2}{\varepsilon_1^{-2} - \varepsilon_2^{-2}}}, \quad (12)$$

where $\varepsilon_1 \mu_1 < 0$ and $\varepsilon_2 \mu_2 < 0$ for the ENG and MNG slabs. When, with proper choices of material parameters, $\beta_{sw}^{TE}$ or $\beta_{sw}^{TM}$ are real-valued quantities, they represent the wave numbers for the TE or TM surface wave that may exist along the interface of the two semi-infinite lossless ENG and MNG media. These relations are formally similar to the wave number expressions for the surface waves supported at the interface of the DPS and DNG half spaces described by the present inventors in "Radiation from a traveling-wave current sheet at the interface between a conventional material and a material with negative permittivity and permeability," Microwave and Opt. Tech. Lett., Vol. 35, No. 6, pp. 460–463, Dec. 20, 2002, and by Lindell et al. in "BW media—media with negative parameters, capable of supporting backward waves," Microwave and Opt. Tech. Lett., Vol. 31, No. 2, pp. 129–133, 2001. (Strictly speaking, in the latter case the expressions (11) and (12) represent the wave numbers of surface waves only if these values of $\beta_{sw}$ are real and greater than both $k_1$ and $k_2$ of the DPS and DNG media. In the ENG-MNG case, however, since $k_1$ and $k_2$ are both imaginary, as long as either of these $\beta_{sw}$ is real, a surface wave may propagate.) From (11) and (12), the conditions for a given interface between ENG and MNG media to support a TE or TM surface wave can be expressed as:

$$TE: \begin{cases} |\mu_1| < |\mu_2| \\ |\eta_1| > |\eta_2| \end{cases} \text{ or } \begin{cases} |\mu_1| > |\mu_2| \\ |\eta_1| < |\eta_2| \end{cases}, \quad (13)$$

$$TM: \begin{cases} |\varepsilon_1| < |\varepsilon_2| \\ |\eta_1| < |\eta_2| \end{cases} \text{ or } \begin{cases} |\varepsilon_1| > |\varepsilon_2| \\ |\eta_1| > |\eta_2| \end{cases}$$

where $\eta_i$ (i=1, 2) denotes the intrinsic impedance of the medium, which is an imaginary quantity for ENG and MNG materials. Conditions (13) imply that no interface may support both TE and TM surface waves, i.e., either a TE or a TM surface wave may be supported, but not both.

Figure 2:
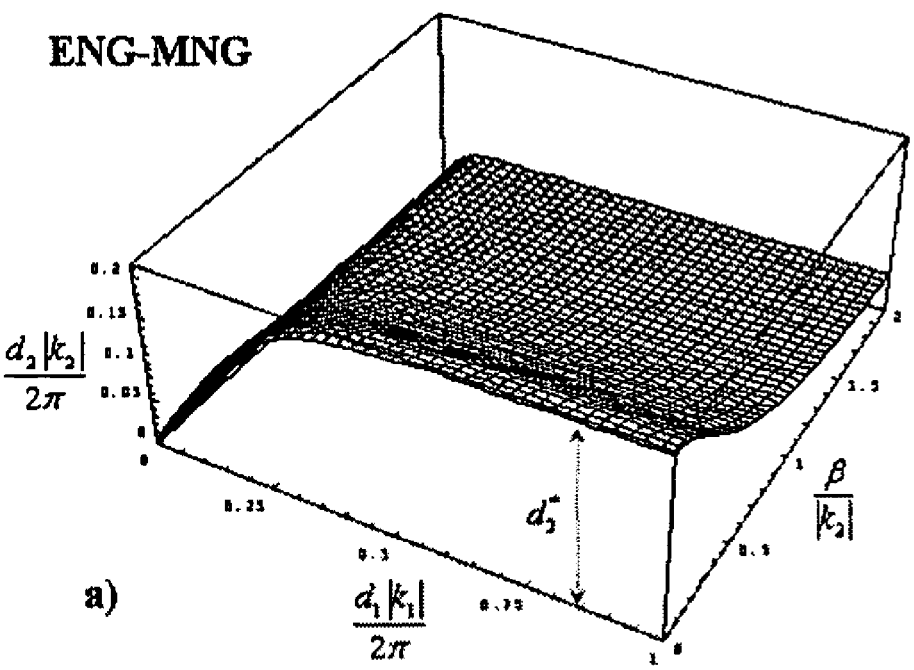
FIG. 2 illustrates a dispersion diagram for TE mode in an ENG-MNG waveguide illustrating the relationship among normalized $d_1$, $d_2$, and normalized real-valued $\beta_{TE}$ for two sets of material parameters for a pair of ENG-MNG slabs at a given frequency: (a) when $\epsilon_1=-2\epsilon_0$, $\mu_1=\mu_0$, $\epsilon_2=3\epsilon_0$, $\mu_2=-2\mu_0$, and (b) when $\epsilon_1=-5\epsilon_0$, $\mu_1=2\mu_0$, $\epsilon_2=2\epsilon_0$, $\mu_2=-\mu_0$.
Figure 2:
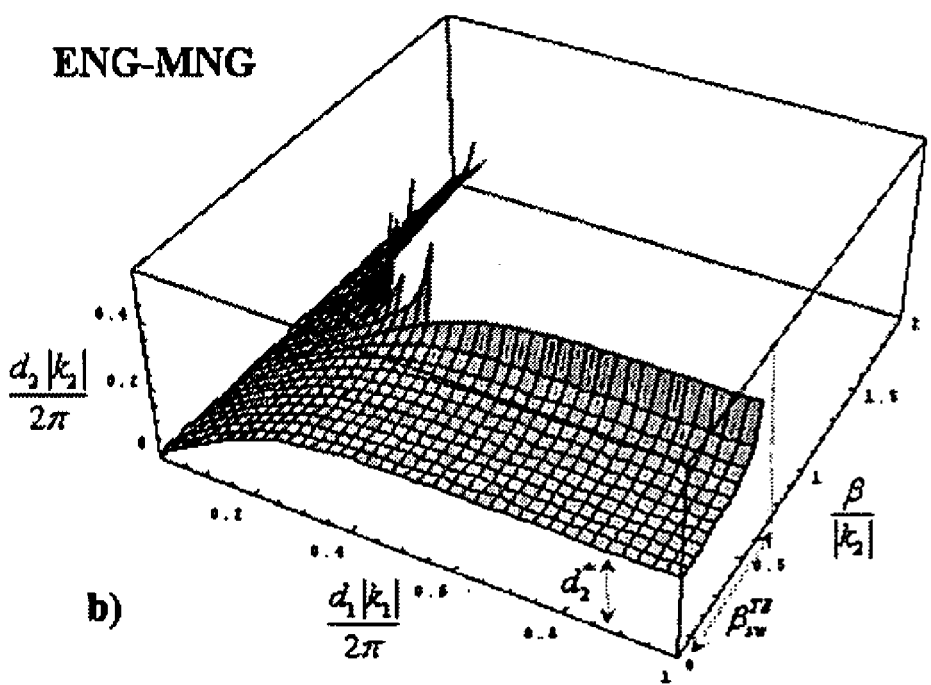

FIG. 2 illustrates the TE dispersion diagram of such an ENG-MNG waveguide for two different sets of material parameters. In particular, FIG. 2 illustrates the relationship among normalized $d_1$, $d_2$, and normalized real-valued $\beta_{TE}$, as described in (7), for two sets of material parameters for a pair of ENG-MNG slabs at a given frequency: FIG. 2a when $\varepsilon_1 = -2\varepsilon_0$, $\mu_1 = \mu_0$, $\varepsilon_2 = 3\varepsilon_0$, $\mu_2 = -2\mu_0$, and FIG. 2b when $\varepsilon_1 = -5\varepsilon_0$, $\mu_1 = 2\mu_0$, $\varepsilon_2 = 2\varepsilon_0$, $\mu_2 = -\mu_0$. The set of material parameters chosen in FIG. 2a does not allow a TE surface wave at the ENG-MNG interface, while the set chosen in FIG. 2b does. The value of $d'_2$ is given by (18) below. One striking feature of these diagrams, as already mentioned, is the single-valuedness of $d_2^{TE}$ for a given set of $d_1$ and $\beta_{TE}$. In order to understand these figures better, some special limits will be explained.

1. Thick Waveguides

At one extreme, assume $|k_1|d_1$ and $|k_2|d_2$ to be large. Equations (5) and (6) may then be simplified as:

$$\frac{|\mu_1|}{\sqrt{|k_1|^2 + \beta_{TE}^2}} \simeq \frac{|\mu_2|}{\sqrt{|k_2|^2 + \beta_{TE}^2}} \quad (14)$$

$$\frac{|\varepsilon_1|}{\sqrt{|k_1|^2 + \beta_{TM}^2}} \simeq \frac{|\varepsilon_2|}{\sqrt{|k_2|^2 + \beta_{TM}^2}}, \quad (15)$$

which are independent of the slab thicknesses. Solving these equations for $\beta_{TE}$ and $\beta_{TM}$, one obtains $\beta_{sw}^{TE}$ and $\beta_{sw}^{TE}$ as given in (11) and (12), respectively. This is physically justified, since for $|k_1|d_1 \gg 1$ and $|k_2|d_2 \gg 1$, the waveguide walls are far apart from the interface between the two slabs, and because the fields are concentrated around this interface, the ENG-MNG pair effectively behaves as two semi-infinite regions. Therefore, provided that a mode is supported by such a thick structure (and this depends whether the interface may support a surface wave), this mode should resemble such a surface wave. This may be seen in FIG. 2b, where in the limit of very large $|k_1|d_1$ and $|k_2|d_2$, the wave number $\beta_{TE}$ approaches the value given in (11). It is worth noting that the curved line, beyond which the dispersion diagram in FIG. 2b "stops" and along which it diverges, is defined by the boundary of the region satisfying (9). Beyond this region, for a given pair of $d_1$ and $\beta$, no real solution for $d_2$ may be obtained from (7). Analogous features may be observed for the TM case.

2. Thin Waveguides

If the thicknesses $|k_1|d_1$ and $|k_2|d_2$ are assumed to be very small, (3) and (4) may be approximated by:

$$\gamma \simeq -\frac{\mu_2}{\mu_1} \quad (16)$$

$$\beta_{TM} \simeq \pm \omega \sqrt{\frac{\mu_1 \gamma + \mu_2}{\gamma/\varepsilon_1 + 1/\varepsilon_2}}, \quad (17)$$

where $\gamma$ is a shorthand for $d_1/d_2$ and should always be a positive quantity. These approximate expressions are valid for thin waveguides loaded with any pair of slabs, since they have been obtained directly from (3) and (4). This point is physically justified considering the fact that in thin waveguides the transverse behavior of the field, which determines the possibility of a mode to propagate, is similar for DPS, DNG and SNG materials, since the hyperbolic and trigonometric sinusoidal functions have somewhat similar behavior in the limit of small arguments.

For a thin waveguide filled with a pair of DPS-DPS layers (and similarly with a pair of ENG-ENG, DPS-ENG, MNG-MNG, DNG-MNG, or DNG-DNG layers), (16) may never be satisfied, because for these pairs $\mu_2/\mu_1 > 0$ and thus no TE mode may propagate in such a thin waveguide, as expected. On the other hand, (17) will provide the approximate value for ATM of the dominant TM mode, if $\beta_{TM}$ turns out to be a real quantity for a given set of $\gamma$ and material parameters.

$\beta_{TM}$ depends on the ratio of layer thicknesses, not on the total thickness. Therefore, this TM mode has no cut-off thickness, i.e., there is not a thickness below which the TM mode may not propagate. For a DPS-DPS or DNG-DNG thin waveguide, this TM mode exists for any ratio γ, and its $\beta_{TM}$ is sandwiched between $k_1$ and $k_2$, which are effectively the two limits of (17) for γ→∞ and γ→0, respectively. This implies that the TM field distribution in the transverse section of a DPS-DPS or DNG-DNG thin waveguide has to be expressed using the exponential functions in one of the two slabs (in the one with smaller wave number) and the sinusoidal functions in the other slab. The allowable ranges of variation of $\beta_{TM}$ in (17) in terms of γ are shown in FIG. 3 for various pairs of slabs.

Figure 3:
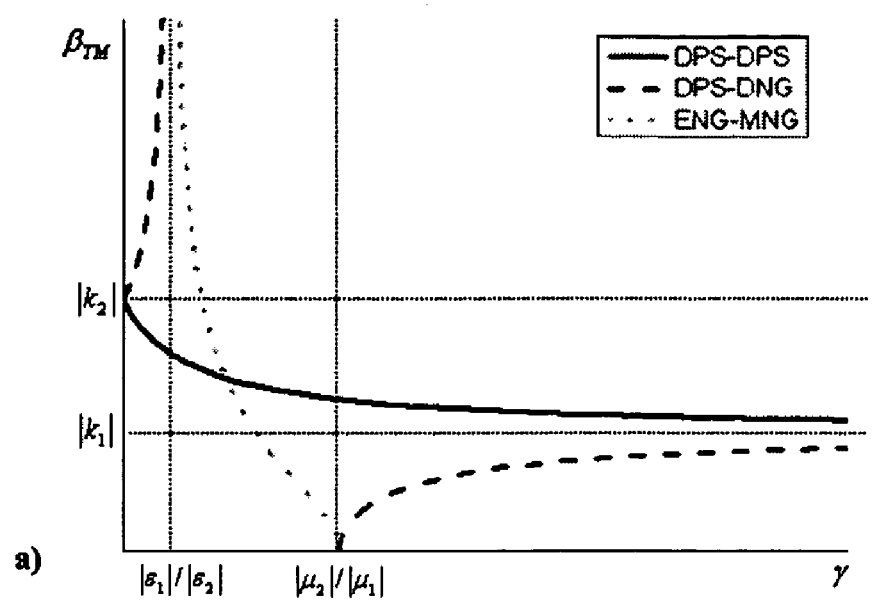
FIG. 3 illustrates $\beta_{TM}$ of the dominant TM mode for thin waveguides filled with a pair of DPS-DPS, ENG-MNG, or DPS-DNG slabs, versus $\gamma=d_1/d_2$, where in (a) the material parameters are chosen such that $\epsilon_1=\pm 2\epsilon_0$, $\mu_1=\pm\mu_0$, $\epsilon_2=\pm 3\epsilon_0$, $\mu_2=\pm\mu_0$ for which $|k_2|>|k_1|$ and in (b) the two slabs have been interchanged, i.e., slab 1 and 2 in (a) are now slabs 2 and 1 in (b), respectively, thus $|k_2|<|k_1|$.
Figure 3:
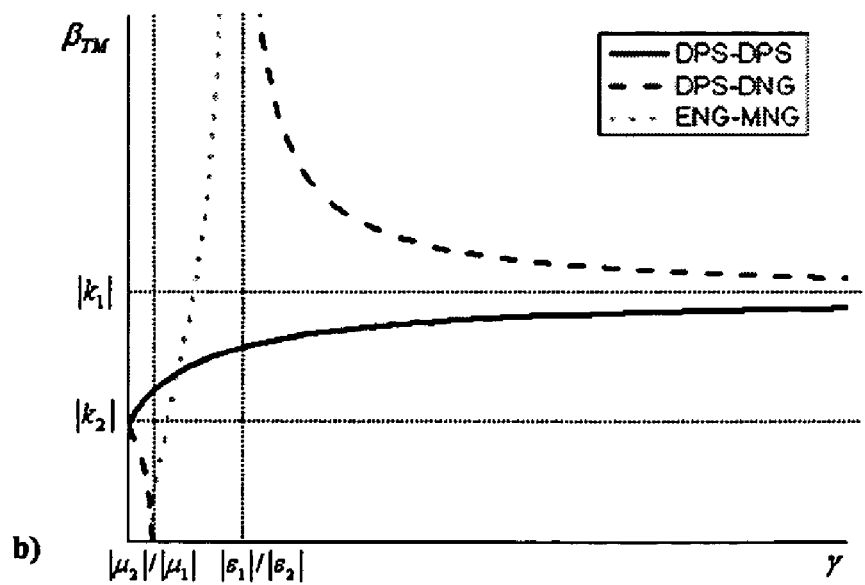

FIG. 3 illustrates $\beta_{TM}$ of the dominant TM mode for thin waveguides filled with a pair of DPS-DPS, ENG-MNG, or DPS-DNG slabs, versus $\gamma = d_1/d_2$. In FIG. 3a, the material parameters are chosen such that $\epsilon_1 = \pm 2\epsilon_0$, $\mu_1 = \mu_0$, $\epsilon_2 = \pm 3\epsilon_0$, $\mu_2 = \pm \mu_0$ for which $|k_2| > |k_1|$; in FIG. 3b, the two slabs have been interchanged, i.e., slab 1 and 2 in FIG. 3a are now slabs 2 and 1 in FIG. 3b, respectively, thus $|k_2| < |k_1|$. FIG. 3b is concerned only with the positive real solutions for $\beta_{TM}$, but its negative real solutions are simply obtained by flipping its sign. As shown in FIG. 3, the ENG-MNG pair behaves differently: the existence of a no-cut-off dominant TM mode is restricted to the waveguides with γ in the range between $|\epsilon_1|/|\epsilon_2|$ and $|\mu_2|/|\mu_1|$. However, its wave number $\beta_{TM}$ is not restricted to any interval, i.e., an ENG-MNG waveguide may have a dominant no-cut-off TM mode with $\beta_{TM}$ ranging from zero to infinity.

In the TE case, a thin waveguide with a pair of ENG-MNG slabs (or also a pair of DNG-ENG, DPS-MNG, or DPS-DNG slabs), has $\mu_2/\mu_1 < 0$, and thus (16) may be satisfied for a certain value of γ. Equation (16) seems to be effectively independent of $\beta_{TE}$. However, in such a limit, the wave number $\beta_{TE}$ of the guided mode may essentially attain any real value, as can be seen in FIGS. 2a and 2b around the region where $|k_1|d_1 \to 0$ and $|k_2|d_2 \to 0$. In such a limit, no matter how thin these layers are (as long as they satisfy (16)), one (and only one) propagating mode may exist. In other words, this waveguide does not have a cut-off thickness for the TE modes. This feature represents a generalization of the analysis for the DPS-DNG thin cavity previously described by the present inventors. For thin layers of ENG and MNG slabs, when $d_1$ and $d_2$ are selected to satisfy relation (16), the particular solution for $\beta_{TE}$, which is unique, may be obtained by solving (5).

Another interesting feature to note in FIG. 2 is the relationship between $d_1$ and $d_2$ at β=0, which is the case of a 1-dimensional cavity filled with the ENG-MNG pair. When $d_1$ is chosen to be large, $d_2$ will approach the finite limit given by:

$$d_2 = \frac{1}{|k_2|} \tanh^{-1}\left(\sqrt{\frac{\mu_1 \epsilon_2}{\mu_2 \epsilon_1}}\right), \quad (18)$$

provided that $$\sqrt{\frac{\mu_1 \epsilon_2}{\mu_2 \epsilon_1}} < 1$$

(which is the case for the parameters used in FIG. 2). This relation is obviously the same for both polarizations, since their behaviors coincide when β→0. Depending on the choice of the material parameters, for a fixed $d_1$, when one increases β from zero the thickness $d_2$ usually does not show local minima or maxima, but it monotonically decreases or increases, as can be seen in FIGS. 2a and 2b, respectively. This feature implies the existence of a single mode in such an ENG-MNG waveguide for a given set of $d_1$ and $d_2$. It is important to point out that such a mono-modal characteristic is effectively independent of the waveguide total thickness. For instance, from FIG. 2a, one can see that for a given $\beta_{TE}$ and a specific allowable $d_2$, thickness $d_1$ may be chosen very large, resulting in a thick waveguide. But still only one single mode is propagating in such a thick waveguide. This feature, not present in a conventional waveguide, may be potentially employed for possible applications in the design of mono-modal waveguides with a large aperture. It can be shown that the mono-modality property is present in any ENG-MNG waveguide, whose interface (between the ENG and MNG media) may support a surface wave (and therefore satisfies (13)), and in most (although not all) of the other ENG-MNG waveguides whose interface may not support a surface wave.

C. Pairs of DNG and DPS Slabs: DPS-DNG, DPS-DPS, and DNG-DNG Pairs

This section will highlight some of the features of guided modes in known parallel-plate waveguides filled with various pairs of DPS and DNG layers, and then compare and contrast these features of such known waveguides with those of the waveguides with SNG pairs, as discussed above, in accordance with the invention. In this case, for lossless DPS and DNG slabs, $\epsilon\mu > 0$, and thus $k_i^2 = \omega^2 \mu_i \epsilon_i > 0$ for i=1, 2.

1. Thin Waveguides

In many regards, various features of the thin DPS-DNG waveguide resemble those of the thin ENG-MNG waveguide. In fact, (16) and (17) again provide the approximate dispersion relations for the TE and TM modes in the DPS-DNG case. The TE polarization in this case is thoroughly equivalent with that of the thin ENG-MNG case. However, the TM mode here deserves further discussion. As may be seen from FIG. 3, the range of variation of $\beta_{TM}$ in the thin DPS-DNG waveguide differs from the ones in the thin ENG and in the standard DPS-DPS waveguides. Here $\beta_{TM}$ may attain values only outside the interval between $|k_1|$ and $|k_2|$ (effectively "complementary" to the standard DPS-DPS case where $\beta_{TM}$ is in this interval), and γ should also be outside the range between $-\mu_2/\mu_1$ and $-\epsilon_1/\epsilon_2$. The fact that thin waveguides loaded with "conjugate" pairs of metamaterials (e.g., DPS-DNG or ENG-MNG) may support non-limited $\beta_{TM}$, may offer interesting possibilities in designing very thin resonant cavities, as already proposed by the present inventors in the DPS-DNG case, for which β=0 when $\gamma = -\mu_2/\mu_1$, or for very thin waveguides having guided modes with high β. A similar observation regarding the possibility of $\beta_{TM}$ to be very large has also been made by Nefedov et al.

2. Waveguides with Arbitrary Thickness

The wave numbers $k_1$ and $k_2$ assume real values in lossless DPS and DNG layers. Therefore, one may consider three distinct intervals for the longitudinal wave number β:

I. $\beta<\min(|k_1|,|k_2|)$

In this interval, the transverse wave numbers $k_{t1}$ and $k_{t2}$ are both real. Equations (3) and (4) may then be rearranged as follows to express the value of $d_2$ in terms of other parameters:

$$d_2^{TE} = \frac{\tan^{-1}\left[-\frac{\mu_1\sqrt{k_2^2-\beta^2}}{\mu_2\sqrt{k_1^2-\beta^2}}\tan\left(\sqrt{k_1^2-\beta^2}\,d_1\right)\right]+m\pi}{\sqrt{k_2^2-\beta^2}} \quad (19)$$

$$d_2^{TM} = \frac{\tan^{-1}\left[-\frac{\varepsilon_2\sqrt{k_1^2-\beta^2}}{\varepsilon_1\sqrt{k_2^2-\beta^2}}\tan\left(\sqrt{k_1^2-\beta^2}\,d_1\right)\right]+m\pi}{\sqrt{k_2^2-\beta^2}}, \quad (20)$$

where m is an integer. From these equations, it may be noted that for a given set of material parameters, when $\beta$ and $d_1$ are fixed, the thickness $d_2$ for which a mode is supported has infinite solutions in DPS-DPS, DPS-DNG, and DNG-DNG waveguides.

II. $\min(|k_1|,|k_2|)<\beta<\max(|k_1|,|k_2|)$

For $|k_1|<\beta<|k_2|$, (19) and (20) are modified as:

$$d_2^{TE} = \frac{\tan^{-1}\left[-\frac{\mu_1\sqrt{k_2^2-\beta^2}}{\mu_2\sqrt{\beta^2-k_1^2}}\tanh\left(\sqrt{\beta^2-k_1^2}\,d_1\right)\right]+m\pi}{\sqrt{k_2^2-\beta^2}} \quad (21)$$

$$d_2^{TM} = \frac{\tan^{-1}\left[-\frac{\varepsilon_2\sqrt{\beta^2-k_1^2}}{\varepsilon_1\sqrt{k_2^2-\beta^2}}\tanh\left(\sqrt{\beta^2-k_1^2}\,d_1\right)\right]+m\pi}{\sqrt{k_2^2-\beta^2}}. \quad (22)$$

(If $|k_2|<\beta<|k_1|$ similar expressions may be obtained, but in this case $d_2^{TM}$ and $d_2^{TE}$ will be expressed in terms of inverse hyperbolic tangent functions, and thus will be single-valued). It should be mentioned that the minus sign in the argument of the inverse tangent functions has disappeared in (22). This is related to the fact that in the thin waveguide approximation discussed earlier, a DPS-DPS waveguide may support a dominant no-cut-off TM mode in this range ($k_1<\beta_{TM}<k_2$), while a thin DPS-DNG waveguide may not (see FIG. 3). In fact, if one takes the limit of (22) for $d_1$ very small, $$d_2^{TM} \cong \frac{\varepsilon_2(\beta^2-k_1^2)}{\varepsilon_1(k_2^2-\beta^2)}d_1 + \frac{m\pi}{\sqrt{k_2^2-\beta^2}}$$

and, when $\varepsilon_2/\varepsilon_1<0$ (DPS-DNG case), the first admissible value for m is unity, which implies that $d_2^{TM}$ cannot be arbitrarily small, and thus not allowing a dominant TM mode with $\beta_{TM}$ in the range ($k_1<\beta_{TM}<k_2$) for a thin DPS-DNG waveguide.

FIGS. 4a and 4b illustrate plots of the lowest admissible values of normalized $d_2$ from (19) and (21), for a given set of material parameters, as a function of normalized $d_1$ and $\beta_{TE}$ for the TE case for: (a) a DPS-DPS waveguide, and (b) a DPS-DNG waveguide. $\varepsilon_1=2$, $\mu_1=1$, $\varepsilon_2=\pm 3$, $\mu_2=\pm 3$ in the TE case. The parameters have been chosen so that $|k_1|<|k_2|$. (Analogous corresponding results may be obtained if $|k_2|<|k_1|$). FIG. 4c shows the multi-branched values of $d_2$ for the case in FIG. 4b. FIG. 4b is essentially taken from FIG. 4c in that only the lowest values of $d_2$ are shown in FIG. 4b.

Figure 4:
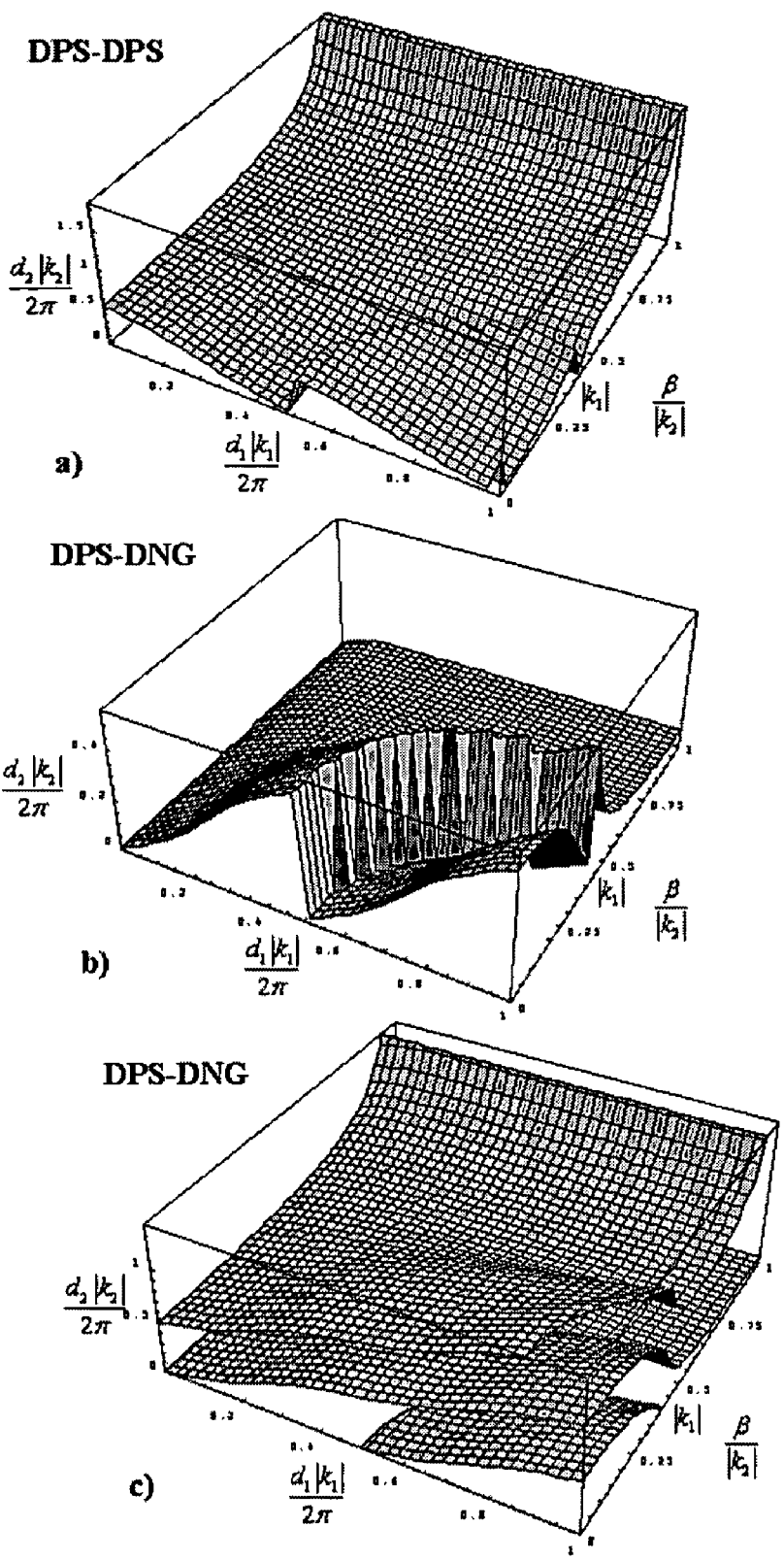
FIGS. 4a and 4b illustrate the lowest admissible values of normalized $d_2$ as a function of normalized $d_1$ and $\beta$, for (a) a DPS-DPS waveguide, (b) a DPS-DNG waveguide. $\epsilon_1=2$, $\mu_1=1$, $\epsilon_2=\pm 3$, $\mu_2=\pm 3$, TE case, where $k_1<k_2$.
FIG. 4c illustrates the multi-branched values of $d_2$ for the case in FIG. 4b.

In connection with FIG. 4, it is important to reiterate that $d_2$ in (19)–(22) are multi-valued for any given set of parameters, and thus the plots of $d_2$ should be multi-branched. (An example of such multi-branched plots is shown in FIG. 4c, which is for the DPS-DNG waveguide of FIG. 4b). However, FIGS. 4a and 4b show only the lowest positive values of $d_2$ for given parameters. The discontinuities observed are due to the jumps from one branch of $d_2$ to another, in order to attain the lowest value for $d_2$; however each branch of $d_2$ by itself is indeed continuous, as evident from FIG. 4c. One can see from FIG. 4a, for standard DPS-DPS waveguides, that as $d_1 \to 0$ the lowest admissible value of $d_2$ to support a mode approaches a non-zero value of $\pi/k_{t2}$, and that this value expectedly becomes infinitely large as $\beta \to k_2$, since $k_{t2} \to 0$. When $d_2 \to 0$, on the other hand, the value of $d_1$ satisfies the relation $$d_1 = \frac{p\pi}{k_{t1}} = \frac{p\pi}{\sqrt{k_1^2-\beta^2}},$$

where p is a positive integer. This locus can be clearly seen in FIG. 4. Thus, in a DPS-DPS waveguide, obviously no TE mode may exist if $$d_1 + d_2 < \min\left(\frac{\pi}{k_{t1}}, \frac{\pi}{k_{t2}}\right),$$

which implies that, as is well known, there is a constraint on the minimum total thickness of any DPS-DPS waveguide in order to have a TE mode.

For DPS-DNG waveguides, however, the situation differs markedly. Because a DNG slab may act as a phase compensator, effectively canceling the phase delay of a DPS slab, a DPS-DNG waveguide may have a TE mode as both $d_1$ and $d_2$ approach zero, as can be seen in FIGS. 4b and 4c. The constraint is on the ratio of the transverse phase delays in the two slabs, not on their sum. For the thin waveguide approximation, in a similar way, this constraint is manifested as the ratio $\gamma=d_1/d_2$, not the sum $d_1+d_2$, and it is described in (16) and (17). This is reflected in the slope of the curve in FIG. 4b in the vicinity of $d_1 \to 0$ and $d_2 \to 0$. The locus for $d_{2=0}$ has the same expression as in the DPS-DPS case, but here p in the expression $d_1 = p\pi/\sqrt{k_1^2-\beta^2}$ may also be zero. However, in FIG. 4b, it may be noted that as $\beta \to k_2-0$, the lowest positive value of $d_2$ does not become infinitely large. This can be understood by evaluating the limit of (21) for $\beta \to k_2-0$ as follows:

$$\lim_{\beta \to k_2-0} d_2^{TE} = -\frac{\mu_1}{\mu_2}\frac{\tanh\left(\sqrt{\beta^2-k_1^2}\,d_1\right)}{\sqrt{\beta^2-k_1^2}} + \frac{m\pi}{\sqrt{k_2^2-\beta^2}}. \quad (23)$$

For a DPS-DNG waveguide, where $-\mu_1/\mu_2$ is a positive quantity, the smallest positive value for $d_2^{TE}$ from (23) is obtained when m=0. This is indeed what is shown in FIG. 4b in the neighborhood of $\beta \to k_2$–0. Upper branches of $d_2^{TE}$ (not shown in FIG. 4b, but shown in FIG. 4c), for which $m \geq 1$, approach $+\infty$ as $\beta \to k_2$–0 due to the term $$\frac{m\pi}{\sqrt{k_2^2 - \beta^2}}.$$

In the DPS-DPS case, the term $-\mu_1/\mu_2$ is a negative quantity, and therefore the lowest value of $d_2^{TE}$ in (23) is obtained when m=1, which causes $d_2^{TE} \to \infty$ as $\beta \to k_2-\epsilon$ for every branch.

Another interesting observation to be made with respect to FIG. 4 is the relationship between $d_1$ and $d_2$ when $\beta=0$. This "$\beta=0$ cut" in the figures represents the dispersion characteristics of a cavity resonator filled with a pair of DPS-DPS layers (FIG. 4a) and DPS-DNG layers (FIG. 4b). The possibility of having a thin sub-wavelength cavity resonator with a pair of thin DPS and DNG slabs may be seen in FIG. 4b for $\beta=0$, as $d_1 \to 0$ and $d_2 \to 0$.

Figure 5:
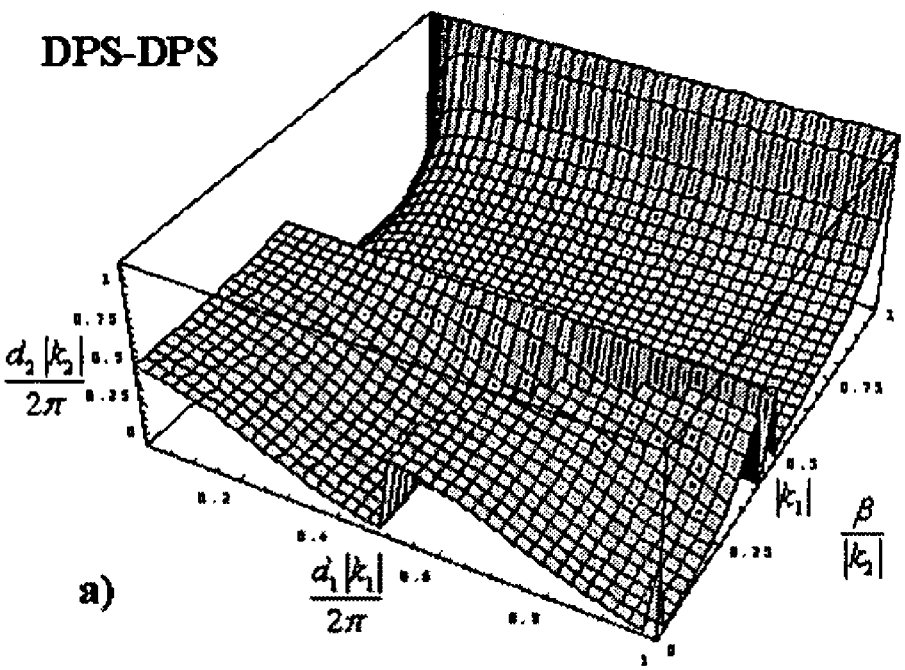
FIGS. 5a and 5b illustrate the lowest admissible values of normalized $d_2$ as a function of normalized $d_1$ and $\beta$, for (a) a DPS-DPS waveguide, (b) a DPS-DNG waveguide. $\epsilon_1=2$, $\mu_1=1$, $\epsilon_2=\pm 3$, $\mu_2=\pm 3$, TM case, where $k_1<k_2$.
Figure 5:
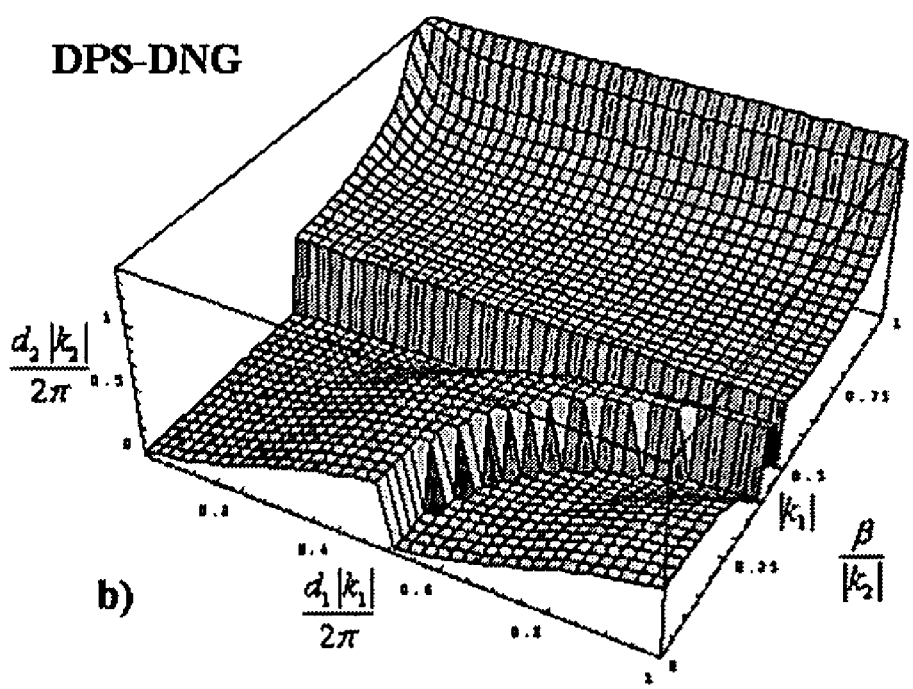

FIG. 5 presents the corresponding plots of FIG. 4 for the TM case. Similar to FIG. 4, in these plots the lowest admissible values of normalized $d_2$ from (20) and (22) are shown as a function of normalized $d_1$ and $\beta_{TM}$. The material parameters are the same as in FIG. 4, and are chosen such that $|k_1|<|k_2|$. Some of the main differences between the TE and TM modes can be observed by comparing the two figures. For instance, the expected presence of a no-cut-off dominant TM mode in the thin DPS-DPS waveguide may be observed in FIG. 5a for $d_1 \to 0$, $d_2 \to 0$, and $k_1 < \beta_{TM} < k_2$, and the absence of this mode in the thin DPS-DNG case in FIG. 5b in the range $k_1 < \beta_{TM} < k_2$. The variation of $\gamma = d_1/d_2$ with $\beta_{TM}$, in the limit of $d_1 \to 0$, $d_2 \to 0$, in the range $k_1 < \beta_{TM} < k_2$ for the DPS-DPS case may also be seen in FIG. 5a, and in the range $\beta_{TM} < k_1$ for the DPS-DNG case in FIG. 5b, all according to (17) and FIG. 3. In particular, it is observed that in thin DPS-DPS waveguides the ratio $d_1/d_2$ attains all real values from 0 to $+\infty$ as $\beta_{TM}$ varies in the admissible interval between $k_1$ and $k_2$ (FIG. 5a), whereas in the thin DPS-DNG case when $k_1 < k_2$ (FIG. 5b) the ratio $d_1/d_2$ varies from $-\mu_2/\mu_1$ (when $\beta_{TM}=0$) to $\infty$ (when $\beta_{TM}=k_1$), and when $k_1 > k_2$ (not shown here) the ratio $d_1/d_2$ goes from zero (when $\beta \to k_2$) to $-\mu_2/\mu_1$ (when $\beta_{TM}=0$), all consistent with (17) and FIG. 3.

III. $\max(|k_1|,|k_2|)<\beta$

In a conventional DPS-DPS waveguide, one may not have a guided mode with real-valued $\beta$ in this range. The same is true for a DNG-DNG waveguide. However, if one of the slabs is made of a lossless material with one and/or both of its permittivity and permeability negative, it will then be possible to have a TE and/or a TM guided mode, as shown below. For this range of $\beta$, the dispersion relations in (3) and (4) may be rewritten as follows:

$$d_2^{TE} = \frac{\tanh^{-1}\left[-\frac{\mu_1\sqrt{\beta^2 - k_2^2}}{\mu_2\sqrt{\beta^2 - k_1^2}}\tanh\left(\sqrt{\beta^2 - k_1^2}\,d_1\right)\right]}{\sqrt{\beta^2 - k_2^2}} \quad (24)$$

$$d_2^{TM} = \frac{\tanh^{-1}\left[-\frac{\varepsilon_2\sqrt{\beta^2 - k_1^2}}{\varepsilon_1\sqrt{\beta^2 - k_2^2}}\tanh\left(\sqrt{\beta^2 - k_1^2}\,d_1\right)\right]}{\sqrt{\beta^2 - k_2^2}}. \quad (25)$$

These equations are analogous to (7) and (8) derived for the ENG-MNG waveguide, and they exhibit similar features. (The next section will give further insights into this analogy.) In both cases, $\beta^2 > k_i^2$ with i=1, 2 and the field distributions in the transverse plane are in terms of hyperbolic sinusoidal functions, and in both cases $d_2$ is single-valued. The characteristics of the surface waves are also similar in both waveguides, and the formal expressions for $\beta_{sw}^{TE}$ and $\beta_{sw}^{TM}$ in (11) and (12) are still valid in the DPS-DNG case with appropriate values for the material parameters.

Figure 6:
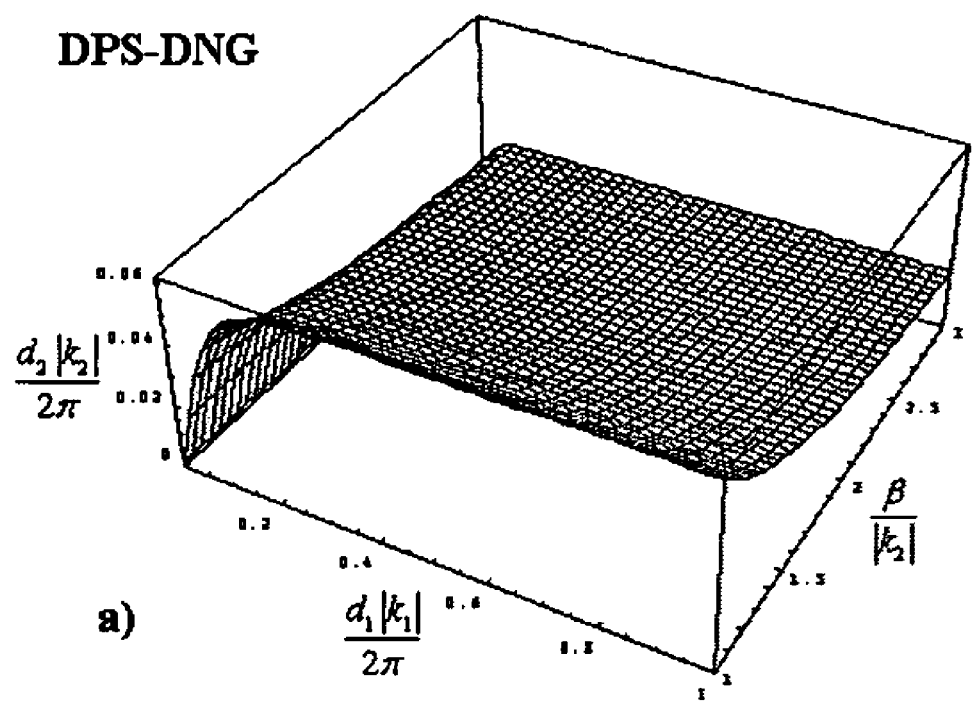
FIG. 6a illustrates normalized $d_2$ in terms of normalized $d_1$ and $\beta$, in the region $\beta>k_2$, for TE modes in the waveguide filled with a pair of DPS and DNG slabs with material parameters given as in FIG. 4b where $k_1<k_2$.
FIG. 6b illustrates normalized $d_2$ in terms of normalized $d_1$ and $\beta$, in the region $\beta>k_2$, for TM modes in the waveguide filled with a pair of DPS and DNG slabs with material parameters given as in FIG. 4b where $k_1<k_2$.
Figure 6:
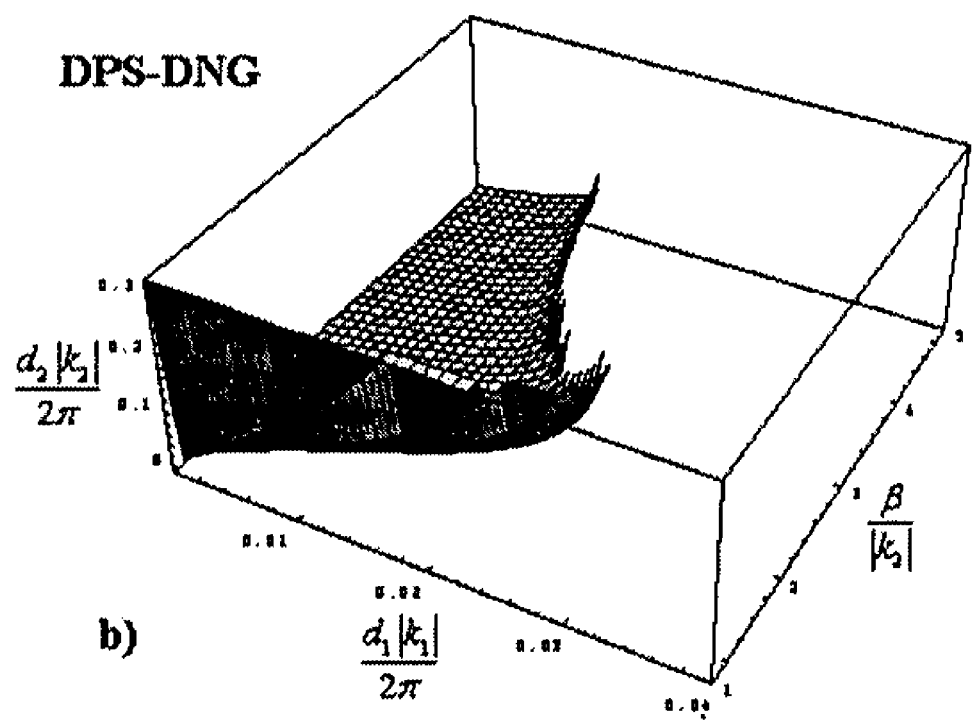
Figure 7:
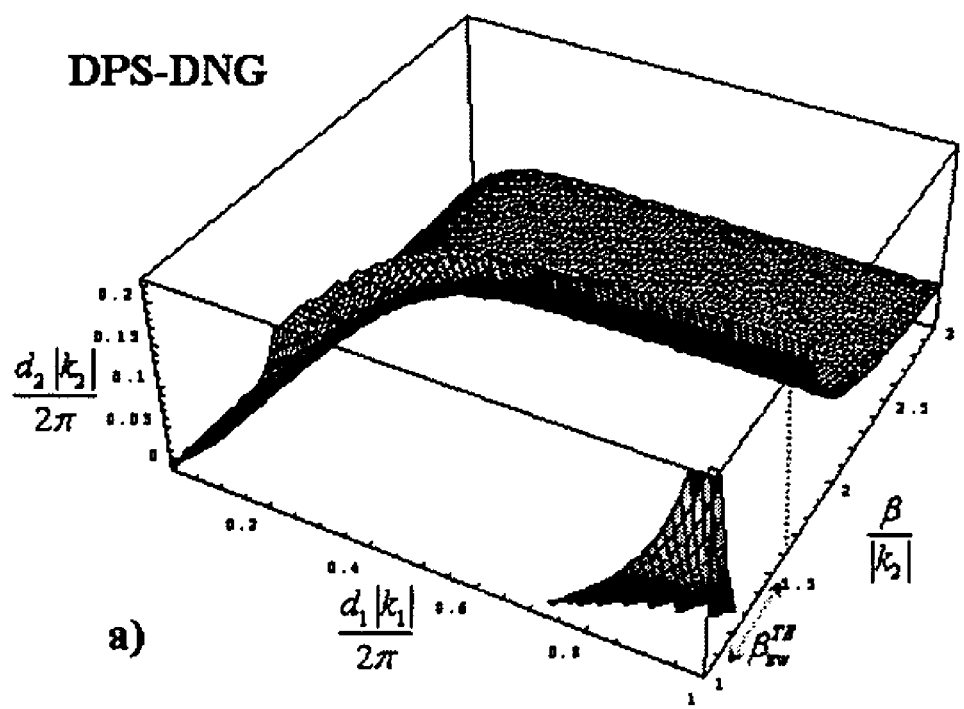
FIG. 7a illustrates normalized $d_2$ in terms of normalized $d_1$ and $\beta$, in the region $\beta>k_2$, for TE modes in the waveguide filled with a pair of DPS and DNG slabs with material parameters $\epsilon_1=3\epsilon_0$, $\mu_1=2\mu_0$, $\epsilon_2=-\epsilon_0$, $\mu_2=-3\mu_0$, where $k_1<k_2$.
FIG. 7b illustrates corresponding quantities for the TM modes in the waveguide of FIG. 7a filled with $\epsilon_1=-2\epsilon_0$, $\mu_1=-\mu_0$, $\epsilon_2=\epsilon_0$, $\mu_2=3\mu_0$, where $k_1<k_2$.
Figure 7:
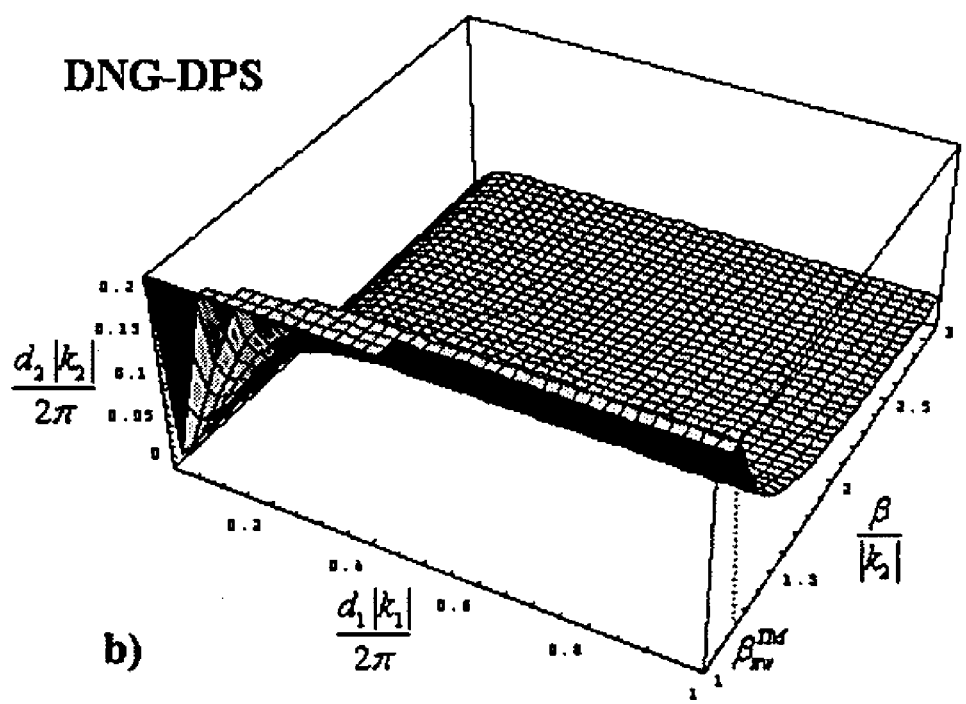

It can be shown that at the interface of any given pair of semi-infinite DPS-DNG media, either a TE surface wave or a TM surface wave, but not both, may exist under the conditions:

$$TE: \begin{cases} |\mu_1| < |\mu_2| \\ |k_1| > |k_2| \end{cases} \text{ or } \begin{cases} |\mu_1| > |\mu_2| \\ |k_1| < |k_2| \end{cases}, \quad (26)$$

$$TM: \begin{cases} |\varepsilon_1| < |\varepsilon_2| \\ |k_1| > |k_2| \end{cases} \text{ or } \begin{cases} |\varepsilon_1| > |\varepsilon_2| \\ |k_1| < |k_2| \end{cases}$$

which are more stringent than the corresponding conditions (13) obtained for SNG media, since in this case one must impose the additional constraint $\beta_{sw} > \max(|k_1|,|k_2|)$. FIG. 6 presents the TE and TM cases for $\beta > k_2$ in the same waveguides of FIGS. 4b and 5b filled with a pair of DPS and DNG slabs. Here again the plots are single-branched, since $d_2$ is single-valued, similar to the ENG-MNG waveguide. FIG. 6a illustrates normalized $d_2$ in terms of normalized $d_1$ and $\beta$, in the region $\beta > k_2$, for TE modes in the waveguide filled with a pair of DPS and DNG slabs with material parameters given as in FIG. 4b where $k_1 < k_2$. As illustrated, for this choice of material parameters, the DPS-DNG interface does not support a TE surface wave or a TM surface wave. In FIG. 6a, $$\frac{|\mu_2|\sqrt{\beta^2 - k_1^2}}{|\mu_1|\sqrt{\beta^2 - k_2^2}} > 1$$

for any value of $\beta$ satisfying $\beta > k_2 > k_1$, implying that for any given set of $d_1$ and $\beta$ one can find a positive real-valued solution for $d_2$. It can be observed that in the thin waveguide approximation, a TE mode exists, and the ratio $d_1/d_2$ again follows (16). Moreover, for any given $d_1$, the solution for $d_2$ is monotonically decreasing with $\beta$ in this region, suggesting that this DPS-DNG waveguide is mono-modal regardless of its total thickness in this range, similar to the case of ENG-MNG waveguides described above. In this case, however, generally the DPS-DNG waveguide may also support a finite number of modes with $\beta < k_2$. In FIG. 6a, $d_1$ may attain any large value, still maintaining the mono-modal property in this range, whereas $d_2$ is limited to a finite range to support this single mode.

FIG. 6b illustrates the plot for the TM polarization in the same DPS-DNG waveguide. In the thin waveguide limit, a no-cut-off TM mode is supported for all values of β in the range β>$k_2$, following (17) and covering the other admissible values for γ complementary to the range shown in FIG. 5b, and in agreement with FIG. 3. The plot in FIG. 6b is only available in the region where the inequality (10) is fulfilled, beyond which $d_2$ does not have a physical solution. At the boundary, where $$\tanh\left(\sqrt{\beta^2 - k_1^2}\, d_1^{TM}\right) = \frac{|\varepsilon_1|\sqrt{\beta^2 - k_2^2}}{|\varepsilon_2|\sqrt{\beta^2 - k_1^2}}, \quad (27)$$

the value of $d_2$ approaches +∞.

It is important to point out that in FIG. 6b for a given set of $d_1$ and $d_2$, one may have two different modes supported in this range, due to the non-monotonic behavior of the boundary (27) in the $d_1$–β plane. In other words, for a given set of material parameters and slab thicknesses, TM modes in this case may possess two distinct solutions for $\beta_{TM}$>|$k_2$|. This anomalous behavior can be present only in waveguides filled with a pair of materials that do not support any surface wave at their interface, as is the case in FIG. 6b. However, as can be seen from FIG. 6a, it is clear that the TE case is different: for any $d_1$ the behavior of $d_2$ in this case is monotonic with β, since the solution for $d_2$ starts from a non-zero value and decreases monotonically to zero when β→∞.

When the interface can support a surface wave, the situation is different. FIG. 7a illustrates normalized $d_2$ in terms of normalized $d_1$ and β, in the region β>$k_2$, for TE modes in the waveguide filled with a pair of DPS and DNG slabs with material parameters $\varepsilon_1$=3$\varepsilon_0$, $\mu_1$=2$\mu_0$, $\varepsilon_2$=−$\varepsilon_0$, $\mu_2$=−3$\mu_0$, where $k_1$<$k_2$. For this choice of material parameters, the DPS-DNG interface does support a TE surface wave. (The region β<$k_2$ would be consistent with the results shown earlier). In this case, however, the asymptote generated by the surface wave modifies the plots in the range β>$k_2$. The existence of a no-cut-off TE mode in the thin waveguide approximation is clearly shown in FIG. 7a near the region where $d_1$→0 and $d_2$→0. Condition (10) again provides the allowable region for given sets of $d_1$ and β. The mono-modality in this range is also evident from FIG. 7a.

The TM polarization for a DPS-DNG waveguide supporting a TM surface wave is shown in FIG. 7b. Corresponding quantities for the TM modes in the waveguide are filled with $\varepsilon_1$=−2$\varepsilon_0$, $\mu_1$=−$\mu_0$, $\varepsilon_2$=$\varepsilon_0$, $\mu_2$=3$\mu_0$, where $k_1$<$k_2$ for which the DPS-DNG interface does support a TM surface wave. Here also, the existence of the asymptotic behavior due to the surface wave provides a certain specific variation for $d_2^{TM}$. In particular, the mono-modality in the range β>max(|$k_1$|,|$k_2$|) is present in this case.

D. Comparison of Modes in the ENG-MNG and DPS-DNG Waveguides

As noted above, several properties of the modes with β>max(|$k_1$|,|$k_2$|) in known DPS-DNG waveguides resemble the modal characteristics in ENG-MNG waveguides. The reason behind this similarity can be found in the transmission-line analogy for ENG, MNG, DNG, and DPS media. In many aspects DPS and DNG media behave similarly to SNG materials when an evanescent wave is considered inside these media.

One may suggest the following heuristic transformations, which map a given SNG material (with parameters (ε, μ)) with propagation wave number β into an equivalent problem involving a DPS or DNG material with equivalent parameters ($\varepsilon^{eq}$, $\mu^{eq}$) and $$\beta_{eq}:(\varepsilon_{ENG}, \mu_{ENG}, \beta^2) \rightarrow \qquad (28)$$
$$(\varepsilon_{DPS}^{eq}, \mu_{DPS}^{eq}, \beta_{eq}^2) \equiv (-\varepsilon_{ENG}, \mu_{ENG}, \beta^2 + 2|k|^2)$$

$$TE:(\varepsilon_{MNG}, \mu_{MNG}, \beta^2) \rightarrow$$
$$(\varepsilon_{DNG}^{eq}, \mu_{DNG}^{eq}, \beta_{eq}^2) \equiv (-\varepsilon_{MNG}, \mu_{MNG}, \beta^2 + 2|k|^2)$$

$$(\varepsilon_{ENG}, \mu_{ENG}, \beta^2) \rightarrow$$
$$(\varepsilon_{DNG}^{eq}, \mu_{DNG}^{eq}, \beta_{eq}^2) \equiv (\varepsilon_{ENG}, -\mu_{ENG}, \beta^2 + 2|k|^2)$$

$$TM:(\varepsilon_{MNG}, \mu_{MNG}, \beta^2) \rightarrow$$
$$(\varepsilon_{DPS}^{eq}, \mu_{DPS}^{eq}, \beta_{eq}^2) \equiv (\varepsilon_{MNG}, -\mu_{MNG}, \beta^2 + 2|k|^2)$$

In the above mapping from SNG materials to DPS and DNG materials, $\beta^2$ always maps to values greater than |k|$^2$. These transformations suggest that for a given ENG-MNG waveguide with material parameters ($\varepsilon_{ENG}$, $\mu_{ENG}$) and ($\varepsilon_{MNG}$, $\mu_{MNG}$) and slab thicknesses $d_1$ and $d_2$, the behavior of the dispersion plot $d_2$ for any given set of $d_1$ and β (for TE and TM polarizations), is equivalent to the one of a suitably designed DPS-DNG waveguide, in the region β>max (|$k_1$|, |$k_2$|). It can be shown that in this case the mapping is given by the following conditions on the material parameters:

$$\frac{|\mu_{DPS}^{eq}|}{|\mu_{DNG}^{eq}|} = \frac{|\mu_{ENG}|}{|\mu_{MNG}|}, \quad \frac{|\varepsilon_{DPS}^{eq}|}{|\varepsilon_{DNG}^{eq}|} = \frac{|\varepsilon_{ENG}|}{|\varepsilon_{MNG}|}, \qquad (29)$$

$$|\varepsilon_{DNG}^{eq}||\mu_{DNG}^{eq}| - |\varepsilon_{DPS}^{eq}||\mu_{DPS}^{eq}| =$$
$$|\varepsilon_{ENG}||\mu_{ENG}| - |\varepsilon_{MNG}||\mu_{MNG}|,$$

when the slab thicknesses remain the same as $d_1$ and $d_2$. The "equivalent" wave number for the guided mode in such a DPS-DNG waveguide may be expressed in terms of the parameters of the original ENG-MNG waveguide as:

$$\beta_{eq}^2 = \beta^2 + \omega^2 |\varepsilon_{ENG}||\mu_{ENG}| + \omega^2 |\varepsilon_{DPS}^{eq}||\mu_{DPS}^{eq}| \qquad (30)$$
$$= \beta^2 + \omega^2 |\varepsilon_{MNG}||\mu_{MNG}| + \omega^2 |\varepsilon_{DNG}^{eq}||\mu_{DNG}^{eq}|,$$

which is obviously greater than both $k_1^{eq}$ and $k_2^{eq}$ in the DPS and DNG slabs. An analogous "inverse transformation" may map any given DPS-DNG waveguide operating in the region β>max (|$k_1$|,|$k_2$|) to an equivalent ENG-MNG waveguide.

From (29) and (30), some other analogies between the pairs of SNG layers with the pairs of DPS and DNG layers may be summarized as follows:

1. ENG-ENG waveguides: for any β their dispersion relations are equivalent to: a) (TE case) a DPS-DPS waveguide with $\beta^2$>$k_i^2$ (i=1, 2) and thus no propagating mode is available; b) (TM case) a DNG-DNG waveguide with $\beta^2$>$k_i^2$ (i=1, 2) and again no propagating mode may exist.

2. MNG-MNG waveguides: for similar reasons, no propagating mode may exist in such waveguides.

3. ENG-MNG waveguides: for any β their dispersion relations are similar to the DPS-DNG waveguides with $\beta^2 > k_i^2$ (i=1, 2) for both polarizations. As shown above, these waveguides may be designed to be mono-modal, regardless of their total thickness.
4. DPS-ENG waveguides: when $\beta^2 < k_{DPS}^2$ their dispersion diagrams are equivalent to: a) (TE case) a DPS-DPS waveguide with $k_1^2 < \beta^2 < k_2^2$; b) (TM case) a DPS-DNG waveguide with $k_1^2 < \beta^2 < k_2^2$. When $\beta^2 > k_{DPS}^2$, they become equivalent to: a) (TE case) an ENG-MNG waveguide; b) (TM case) an MNG-MNG waveguide, both not supporting any propagating mode.
5. DPS-MNG, DNG-ENG, DNG-MNG waveguides: Corresponding results can be obtained by using duality. In particular, the presence of a no-cut-off TM mode in a standard DPS-DPS waveguide implies $k_1^2 < \beta^2 < k_2^2$, and this waveguide may then be regarded as a DPS-MNG waveguide, which allows no cut-off solutions, following (17), for any $\beta < k_{DPS}$.

These and other analogies may be verified with the results set forth above. A set of analyses employing this transmission-line analogy as applied specifically to the waveguide geometries has been presented by the present inventors in an article entitled "Distributed-circuit-element description of guided-wave structures and cavities involving double-negative or single-negative media," Proc. SPIE: Complex Mediums IV: beyond Linear Isotropic Dielectrics, Vol. 5218, San Diego, Calif., Aug. 4–5, 2003, pp. 145–155, the contents of which are hereby incorporated by reference.

E. Guided Mode Waveguides Using at Least One SNG Material

Figure 1B:
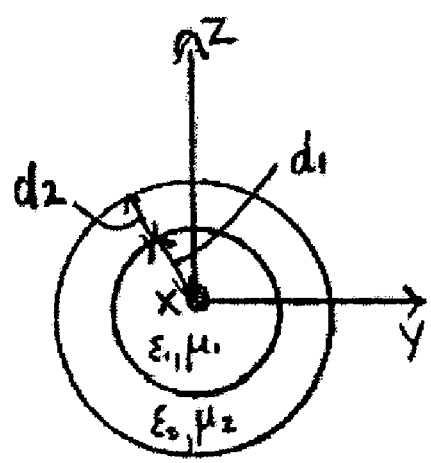
FIG. 1b illustrates the geometry of a waveguide with a pair of concentric layers made of any two of epsilon-negative (ENG), mu-negative (MNG), double-negative (DNG), and double-positive (DPS) materials in accordance with the invention.

Various properties of guided modes in parallel-plate waveguides filled with pairs of layers made of any two of the lossless ENG, MNG, DPS, and DNG materials have been discussed above. It has been shown that, depending on the pairing the SNG materials and the choice of the material parameters, one may obtain modal features that differ significantly from those of guided modes in conventional DPS-DPS waveguides and DNG-DPS waveguides. Among several important characteristics, the following are particularly significant: the presence of TM and TE modes with no cut-off thickness in the limit of thin DPS-DNG and ENG-MNG waveguides, the possibility of mono-modality in thick ENG-MNG waveguides and in DPS-DNG waveguides for slow modes with $\beta > \max(|k_1|, |k_2|)$, and the presence of modes with wave number β greater than the wave numbers of both layers. These features suggest applications of SNG materials (ENG and/or MNG) in the design of ultra-thin waveguides capable of supporting both TM and TE modes, single-mode thick fibers with less restriction and more flexibility on the fiber thickness, very thin cavity resonators, and other novel devices and components. The geometry is also not limited to parallel plate waveguides but also may include concentric waveguides where one SNG material encircles the other SNG material, DPS or DNG material as illustrated in FIG. 1b, and/or open waveguides without parallel plates.

In cases where the incident wave does not have an angle of incidence that permits the creation of a surface wave or a guided mode in the bilayer material of the invention, the discussion of the following section sets forth the characteristic scattering properties of the bilayer material.

II. Resonance, Tunneling, and Transparency in a Pair of Slabs with at Least One SNG Layer A. Geometry Consider a Cartesian coordinate system (x,y,z) with unit vectors $\hat{x}$, $\hat{y}$, and $\hat{z}$. Take a transverse-magnetic (TM) $e^{j\omega t}$-monochromatic plane wave in free space with its wave vector $k_0 = \hat{x}k_x + \hat{z}\sqrt{k_0^2 - k_x^2}$ in the x-z plane, with $k_0 = \omega\sqrt{\mu_0\epsilon_0}$, and its magnetic and electric field vectors $H_{inc}^{TM}$ and $E_{inc}^{TM}$ given below:

$$H_{inc}^{TM} = \hat{y} H_0 e^{-jk_x x - j\sqrt{k_0^2 - k_x^2}\, z} \tag{31}$$

$$E_{inc}^{TM} = \left( \hat{x} \frac{\sqrt{k_0^2 - k_x^2}}{\omega\varepsilon_0} - \hat{z} \frac{k_x}{\omega\varepsilon_0} \right) H_0 e^{-jk_x x - j\sqrt{k_0^2 - k_x^2}\, z}$$

Assume the problem to be two-dimensional, i.e., all quantities are independent of the y coordinate. Also assume the x-component of the wave vector, $k_x$, to be a real quantity, and thus for the case of a propagating wave $k_x^2 \leq \omega^2\mu_0\epsilon_0$. If, however, $k_x^2 > \omega^2\mu_0\epsilon_0$, the wave will be evanescent, and the choice for the root square will be $\sqrt{k_0^2 - k_x^2} = -j\sqrt{k_x^2 - k_0^2}$ to have a decaying wave along the +z direction.

Figure 8:
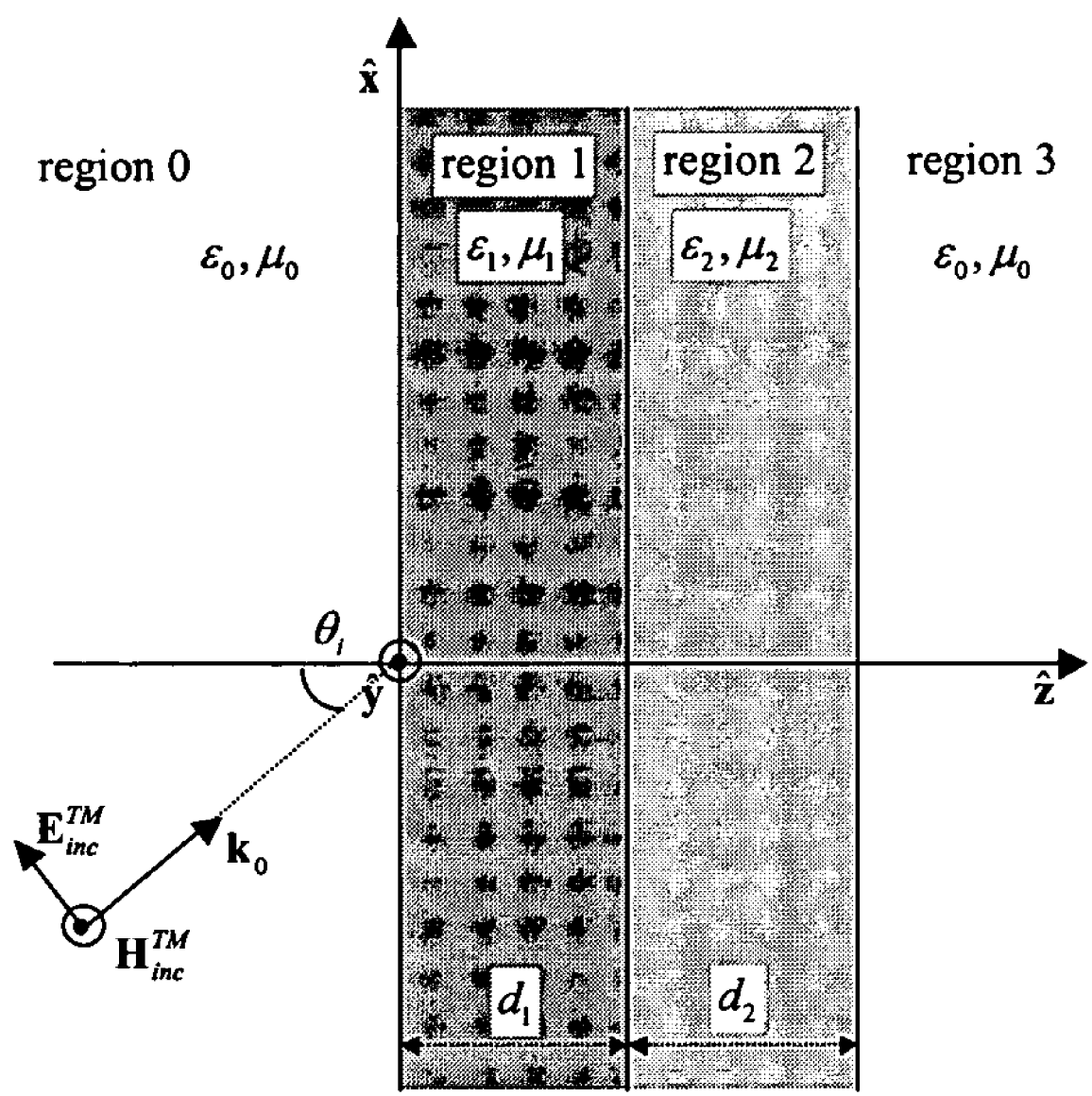
FIG. 8 illustrates the geometry of the TM wave interaction with two slabs, one of which can be made of an epsilon-negative (ENG) material, in which real part of permittivity is negative (but real part of permeability is positive), and the other made of a mu-negative (MNG) material, in which the real part of permeability can be negative (but real part of permittivity is positive).

Consider a pair of slabs of thicknesses $d_1$ and $d_2$, one made of a lossless ENG material and the other of a lossless MNG material inserted in the region $0 \leq z \leq d_1 + d_2$, as shown in FIG. 8. The regions 0 and 3 are considered to be free space. Take the TM incident wave to be the one given in Equation (31). Since in these ENG and MNG slabs με<0, $k_x^2 > \omega^2\mu\epsilon$ in each slab and thus waves in such layers are obviously always evanescent. Therefore, the magnetic field vectors in the four regions can be written as:

$$H_0^{TM} = \hat{y} H_0 e^{-jk_x x} \left( e^{-j\sqrt{k_0^2 - k_x^2}\, z} - R^{TM} e^{j\sqrt{k_0^2 - k_x^2}\, z} \right) \qquad z < 0 \tag{32}$$

$$H_1^{TM} = \hat{y} H_0 e^{-jk_x x} \left( C_{1+}^{TM} e^{-\sqrt{k_x^2 - k_1^2}\, z} + C_{1-}^{TM} e^{\sqrt{k_x^2 - k_1^2}\, z} \right) \qquad 0 < z < d_1$$

$$H_2^{TM} = \hat{y} H_0 e^{-jk_x x} \left( C_{2+}^{TM} e^{-\sqrt{k_x^2 - k_2^2}\, (z - d_1)} + C_{2-}^{TM} e^{\sqrt{k_x^2 - k_2^2}\, (z - d_1)} \right) \qquad d_1 < z < d_2$$

$$H_3^{TM} = \hat{y} T^{TM} H_0 e^{-jk_x x} e^{-j\sqrt{k_0^2 - k_x^2}\, (z - d_1 - d_2)} \qquad d_1 + d_2 < z$$

where $R^{TM}$ and $T^{TM}$ are the reflection and transmission coefficients, the coefficient C's are the amplitude coefficients of waves in each of the slabs, normalized to the amplitude of the incident wave, the subscripts (+) and (−) indicate the forward-decaying and backward-decaying evanescent waves in each slab, and $k_n = \omega\sqrt{\mu_n}\sqrt{\epsilon_n} = k_{nr} - jk_{ni}$ with n=1, 2 represents the wave number in each slab. The expression for the electromagnetic fields in all four regions can be trivially obtained from Maxwell's equations. Since these slabs are made of SNG materials, $k_{ni} > 0$ and $k_{ni} >> |k_{nr}|$. The reflection and transmission coefficients and the coefficients C's can be obtained by requiring the tangential components of the electric and of the magnetic fields to be continuous at the boundaries. The detailed expressions for these coefficients for the general 2-slab problem may be obtained, but as these expressions are known to those skilled in the art and are very long, they will not be included here.

Figure 9A:
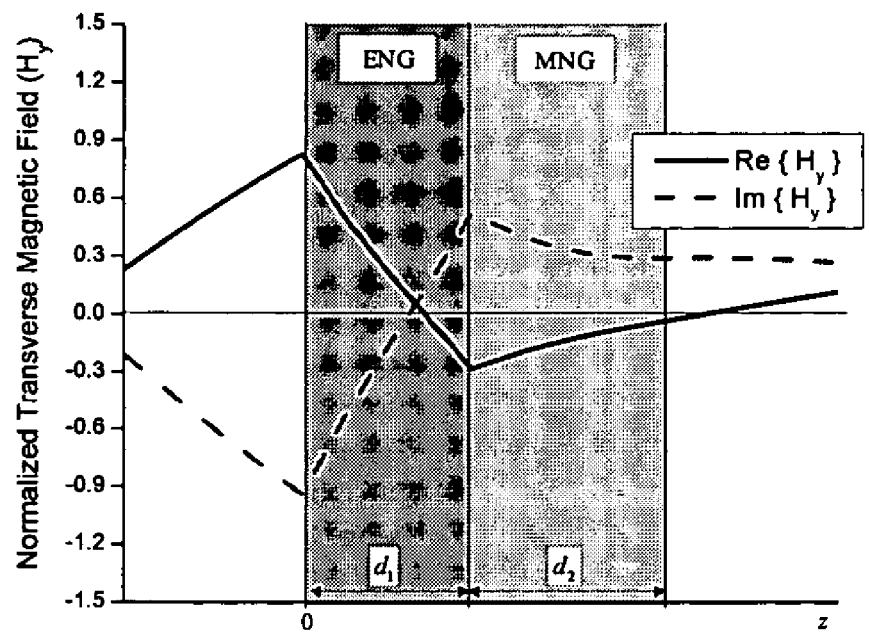
FIG. 9a illustrates the real and imaginary parts of the normalized transverse magnetic field $H_y$ as a function of z coordinate when a normally incident TM wave illuminates a sample pair of lossless ENG-MNG slabs.
Figure 9B:
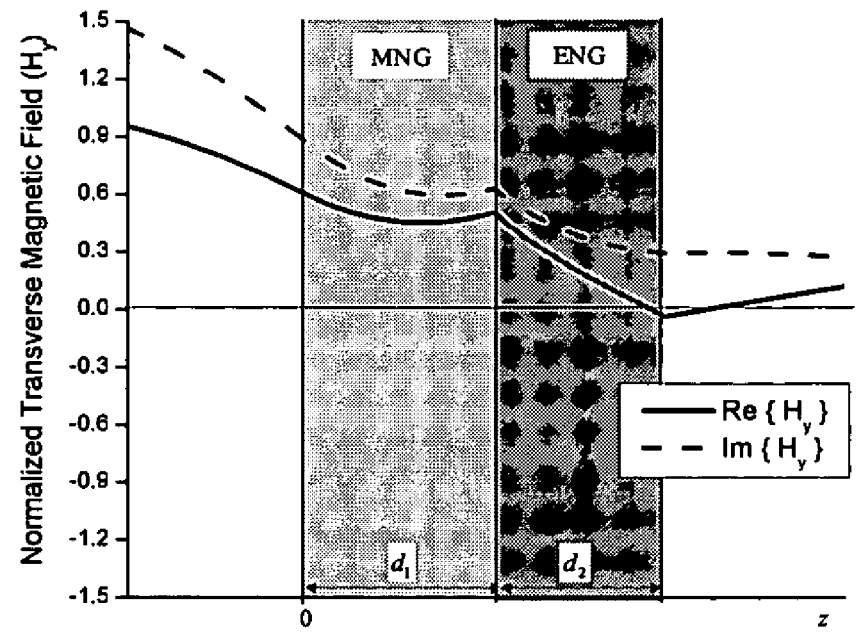

To gain some insights into the behavior of the fields in these regions, instead the inventors present the plots of real and imaginary parts of the magnetic fields ($H_y^{TM}$ component) in these four regions for selected parameter values. FIG. 9 shows the magnetic field $H_y$ behavior inside and outside the slabs for a sample pair of ENG-MNG slabs. In particular, FIG. 9 illustrates the real and imaginary parts of the normalized total transverse magnetic field as a function of z coordinate, when a normally incident TM wave illuminates a pair of lossless ENG-MNG slabs (FIG. 9a) and lossless MNG-ENG slabs (FIG. 9b). Here the magnetic field intensity of the TM incident wave is assumed to be unity, i.e., $H_0 = 1$ in Equation (31). In FIG. 9a, the parameters are chosen to be $$\varepsilon_1 = -3\varepsilon_0, \mu_1 = 2\mu_0, \varepsilon_2 = \varepsilon_0,$$

$$\mu_2 = -5\mu_0, d_1 = \frac{2\pi}{5|k_1|}, d_2 = \frac{2\pi}{5|k_2|}, \theta_i = 0;$$

and in FIG. 9b the two slabs are simply reversed in position. The value of reflection, transmission, and C's coefficients are then found to be R=0.17+0.94j, T=−0.04+0.3j, $C_{1+}$=1−1.19j, $C_{1-}$=−0.16+0.25j, $C_{2+}$=−0.3+0.48j, $C_{2-}$=0.01+0.04j in FIG. 9a and R=0.4−0.87j, T=−0.04+0.3j, $C_{1+}$=0.49+0.75j, $C_{1-}$=0.1+0.12j, $C_{2+}$=0.56+0.59j, $C_{2-}$=−0.06+0.03j in FIG. 9b.

In FIG. 9a, the slope of the term $H_y$ has opposite signs on both sides of the boundary $z=d_1$ between the slabs, in addition to the change of slope sign at the boundary z=0. This is due to the fact that the tangential component of the electric field $$E_x = \frac{-1}{j\omega\varepsilon}\frac{\partial H_y}{\partial z}$$

must be continuous at the boundaries, implying that $$\frac{-1}{j\omega\varepsilon_0}\frac{\partial H_y}{\partial z}\bigg|_{z=0^-} = \frac{-1}{j\omega\varepsilon_1}\frac{\partial H_y}{\partial z}\bigg|_{z=0^+}.$$

Since in FIG. 9a, $\epsilon_0 > 0$ and $\epsilon_1 < 0$, the term $$\frac{\partial H_y}{\partial z}$$

thus has opposite signs on both sides of z=0 (and also on both sides of $z=d_1$). As a result of this change of slope at $z=d_1$, the dominant behavior of the magnetic field (for the TM case) in the two slabs is different, i.e., if in the first slab the total magnetic field is decreasing just before it gets to $z=d_1$, it will be increasing in the second slab just past $z=d_1$, or vice versa. FIG. 9b shows the plot of $H_y$ for the case where the first slab is a MNG medium and the second slab is an ENG medium. A similar observation can be made here with the change of slope sign at $z=d_1$ and $z=d_1+d_2$.

This difference between the field behavior in the ENG and MNG parts of this bilayer structure obviously affects the transmission and reflection coefficients and, as will be shown in the next section, this can lead to an interesting anomalous tunneling, transparency and resonance phenomenon.

B. Equivalent Transmission-Line (TL) Model and Distributed Circuit Elements for the ENG-MNG Bilayer It is well known that considering the equivalent TL model for a TM plane wave propagation in a homogeneous isotropic medium, one can write $$\frac{\partial E_x}{\partial z} = -j\omega\tilde{\mu}_{eq}H_y$$

and $$\frac{\partial H_y}{\partial z} = -j\omega\tilde{\varepsilon}_{eq}E_x$$

where $\tilde{\mu}_{eq}$ and $\tilde{\epsilon}_{eq}$ are shorthand for $$\tilde{\mu}_{eq} \equiv \mu\left(1 - \frac{k_x^2}{\omega^2\mu\varepsilon}\right) \text{ and } \tilde{\varepsilon}_{eq} \equiv \varepsilon$$

for the TM case. (Using duality, one can find the corresponding terms for the TE case.) With these expressions one can express the equivalent inductance per unit length $L_{eq}$ and equivalent capacitance per unit length $C_{eq}$ for this TL model as:

$$L_{eq} \equiv A_1\tilde{\mu}_{eq} = A_1\mu\left(1 - \frac{k_x^2}{\omega^2\mu\varepsilon}\right), C_{eq} \equiv A_2\tilde{\varepsilon}_{eq} = A_2\varepsilon \quad (33)$$

where $A_1$ and $A_2$ are two positive constant coefficients that depend on the geometry of the equivalent transmission line. Using the concept of $\tilde{\mu}_{eq}$ and $\tilde{\mu}_{eq}$, the inventors propose appropriate equivalent TL models for waves, either propagating or evanescent waves, inside DPS, DNG, ENG, and MNG slabs. Such TL models for the lossless case are listed in Table 1 for easy reference. Table 1 illustrates effective TL models for TM waves in lossless DPS, DNG, ENG, MNG slabs. Both propagating and evanescent waves are considered in Table 1. In each case, a sketch of infinitesimal section of TL model with distributed series and shunt reactive elements per unit length of the line is shown. In addition, it is also indicated whether $L_{eq}$ and $C_{eq}$ is positive or negative, are used as the distributed series (first symbol) and shunt elements (second symbol), respectively, in the TL model; and finally (v) when the loss is present, one can always add the equivalent distributed series resistance and shunt conductance per unit length in the TL model given in Table 1.

TABLE 1

| | DPS ($\mu > 0$, $\epsilon > 0$) | DNG ($\mu < 0$, $\epsilon < 0$) | ENG ($\mu > 0$, $\epsilon < 0$) | MNG ($\mu < 0$, $\epsilon > 0$) |
|---|---|---|---|---|
| TM Propagating wave $k_x^2 < \omega^2 \mu\epsilon$ | $L_{eq} > 0$ $\beta \in \mathfrak{R}$ $C_{eq} > 0$ $Z \in \mathfrak{R}$ 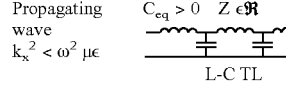 L-C TL | $L_{eq} < 0$ $\beta \in \mathfrak{R}$ $C_{eq} < 0$ $Z \in \mathfrak{R}$ 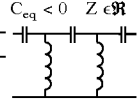 C-L TL | Not applicable, since for $k_x \in \mathfrak{R}$, $k_x^2 > \omega^2 \mu\epsilon$ for all lossless ENG | Not applicable, since for $k_x \in \mathfrak{R}$, $k_x^2 > \omega^2 \mu\epsilon$ for all lossless MNG |
| TM Evanescent wave $k_x^2 > \omega^2 \mu\epsilon$ | $L_{eq} < 0$ $\beta \in \mathfrak{I}$ $C_{eq} > 0$ $Z \in \mathfrak{I}$ 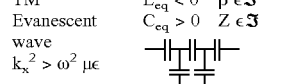 C-C TL | $L_{eq} > 0$ $\beta \in \mathfrak{I}$ $C_{eq} < 0$ $Z \in \mathfrak{I}$ 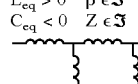 L-L TL | $L_{eq} > 0$ $\beta \in \mathfrak{I}$ $C_{eq} < 0$ $Z \in \mathfrak{I}$ 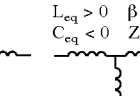 L-L TL | $L_{eq} < 0$ $\beta \in \mathfrak{I}$ $C_{eq} > 0$ $Z \in \mathfrak{I}$ 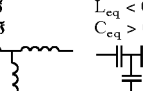 C-C TL | and whether $\beta$ and Z are real or imaginary quantities. The symbols L-C, C-C, L-L, and C-L transmission lines are used to indicate what effective reactive elements are used as the distributed series (first symbol) and distributed shunt effective elements (second symbol), respectively, in the TL model. In assigning equivalent TL models for each of these cases in Table 1, the inventors take into account the following points:

(i) if $\tilde{\mu}_{eq}$ happens to be a negative real quantity, $L_{eq}$ will be negative real, which conceptually translates into "negative inductive reactance" $j\omega L_{eq} = -j\omega |L_{eq}|$ at a given frequency. This negative reactance can be effectively regarded as the reactance of an equivalent "positive capacitance", i.e., $$-j\omega |L_{eq}| = -\frac{j}{\omega C_{\textit{eff}}}$$

for that given frequency. So in the TL analogy, whenever $L_{eq} < 0$, it can be thought of as an effective positive capacitance $C_{\textit{eff}}$. In such a case, the TL model consists of series capacitance $C_{\textit{eff}}$ (instead of conventional series inductance);

(ii) likewise, if $\epsilon_{eq} < 0$, $C_{eq} < 0$, which can be viewed as an effective shunt positive inductance $L_{\textit{eff}}$, i.e., $$+\frac{j}{\omega |C_{eq}|} = +j\omega L_{\textit{eff}}.$$

In this situation, a shunt inductor (instead of a shunt capacitance) will appear in the TL model;

(iii) assuming $k_x$ to be a real quantity. Thus, for a propagating wave in a lossless medium, $k_x^2 \leq \omega^2 \mu\epsilon$, and for an evanescent wave $k_x^2 > \omega^2 \mu\epsilon$. Therefore, as mentioned earlier, waves in lossless ENG and MNG slabs are obviously always evanescent, hence there is only one single entry for each ENG and MNG case in Table 1;

(iv) the inventors use the symbols L-C, C-C, L-L, and C-L transmission lines to distinguish which reactive elements It is noted that the equivalent C-L transmission line as the "left-handed" transmission line has already been considered in the prior art as a realization of one- and two-dimensional wave propagation in DNG media.

The paired ENG-MNG structure can now be viewed as the cascade of transmission line segments with appropriate TL elements shown in Table 1, representing the TM wave propagation in the ENG and MNG slabs sandwiched between the two similar semi-infinite lines. Using the standard TL formulation, one can find the following expression for the transverse input impedance at the front face (z=0) of any generic bilayer followed by a uniform half space:

$$Z_{in}(z=0) = \frac{Z_1\{jZ_1\tan(\beta_1 d_1)[Z_2 + jZ_0\tan(\beta_2 d_2)] + Z_2[Z_0 + jZ_2\tan(\beta_2 d_2)]\}}{Z_1 Z_2 + j\{Z_0 Z_1\tan(\beta_2 d_2) + Z_2\tan(\beta_1 d_1)[Z_0 + jZ_2\tan(\beta_2 d_2)]\}} \quad (34)$$

where the symbols Z's and $\beta$'s indicate the characteristic impedance and wave number in each segment of this cascaded line and can be obtained from Table 1 for different slabs.

The inventors are interested in exploring the possible conditions upon which one would get zero reflection from this structure, thus having complete transmission of the TM wave through a pair of ENG-MNG slabs. Assuming for the moment that the first slab is ENG and the second is MNG, from Table 1 the lossless ENG slab the characteristic impedance of the equivalent L-L transmission line is purely inductive, $$Z_1 \equiv Z_{ENG} \equiv jX_{ENG} = \frac{\sqrt{k_x^2 - \omega^2 \mu_1 \varepsilon_1}}{j\omega \varepsilon_1}$$

with $X_{ENG} > 0$ since $\epsilon_1 < 0$ and $\mu_1 > 0$, whereas for the lossless MNG slab the C-C line is purely capacitive, i.e., $$Z_2 \equiv Z_{MNG} \equiv jX_{MNG} = \frac{\sqrt{k_x^2 - \omega^2 \mu_2 \varepsilon_2}}{j\omega \varepsilon_2}$$

with $X_{MNG}<0$ since $\varepsilon_2>0$ and $\mu_2<0$. In both slabs, the wave numbers are imaginary, i.e., $\beta_1 \equiv \beta_{ENG} = -j\sqrt{k_x^2 - \omega^2 \mu_1 \varepsilon_1}$ and $\beta_2 \equiv \beta_{MNG} = -j\sqrt{k_x^2 - \omega^2 \mu_2 \varepsilon_2}$ since the wave inside each slab is evanescent. The characteristics impedance $Z_0$ and the wave number $\beta_0$, of the semi-infinite segments of the TL, which represent propagating waves in the outside DPS region, are both real quantities expressed as $$Z_0 = \frac{\sqrt{\omega^2 \mu_0 \varepsilon_0 - k_x^2}}{\omega \varepsilon_0}$$

and $\beta_0 = \sqrt{\omega^2 \mu_0 \varepsilon_0 - k_x^2}$. The zero-reflection condition $Z_{in}(z=0) = Z_0$ can be achieved if and only if:

$$Z_0(Z_2^2 - Z_1^2)\tan(\beta_1 d_1)\tan(\beta_2 d_2) + jZ_2(Z_1^2 - Z_0^2)\tan(\beta_1 d_1) + jZ_1(Z_2^2 - Z_0^2)\tan(\beta_2 d_2) = 0 \quad (35)$$

Substituting the values of Z's and β's for the ENG and MNG slabs given above into Equation. (35) leads to the following expression:

$$Z_0(X_{ENG}^2 - X_{MNG}^2)\tanh(|\beta_{ENG}|d_1)\tanh(|\beta_{MNG}|d_2) + \quad (36)$$
$$j[X_{MNG}(Z_0^2 + X_{ENG}^2)\tanh(|\beta_{ENG}|d_1) + $$
$$X_{ENG}(Z_0^2 + X_{MNG}^2)\tanh(|\beta_{MNG}|d_2)] = 0$$

The above condition will be satisfied for a pair of finite-thickness ENG and MNG slabs if and only if:

$$X_{ENG}^2 = X_{MNG}^2 \text{ and } X_{MNG}\tanh(|\beta_{ENG}|d_1) \quad (37)$$
$$= -X_{ENG}\tanh(|\beta_{MNG}|d_2),$$

leading to the conditions:

$$X_{ENG} = -X_{MNG} \text{ and } \beta_{ENG}d_1 = \beta_{MNG}d_2. \quad (38)$$

A pair of lossless ENG and MNG slabs satisfying (38) gives rise to a zero-reflection scenario, when it is sandwiched between two similar half spaces. It is interesting to note that the above conditions in Equation (37) are the necessary and sufficient conditions for zero reflection from any pair of "single-negative (SNG)" slabs sandwiched between two similar semi-infinite regions. Thus, for a given $k_x$ if the parameters $\mu_1$, $\varepsilon_1$ of the ENG slab, $\mu_2$, $\varepsilon_2$ of the MNG slab and the thicknesses $d_1$ and $d_2$ are chosen such that Equation (38) is fulfilled, a complete transmission of a wave can be had through this lossless ENG-MNG bilayer structure, resulting in an interesting tunneling phenomenon. The inventors name such an ENG-MNG pair a "matched pair" for the given value of $k_x$.

Figure 10A:
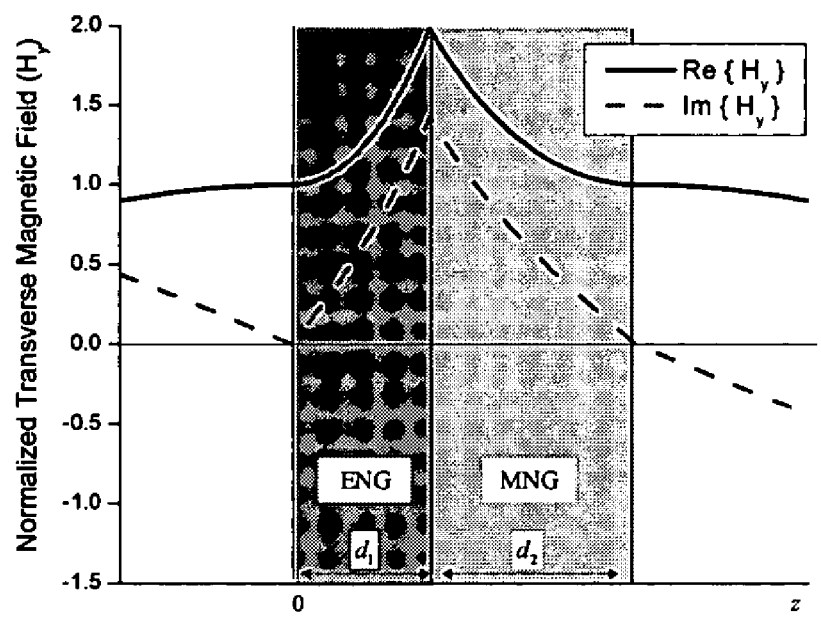
FIG. 10a illustrates the real and imaginary parts of the normalized transverse magnetic field $H_y$ as a function of z coordinate when a normally incident TM wave with a 45° angle of incidence impinges on a "matched pair" of lossless ENG-MNG slabs.
Figure 10B:
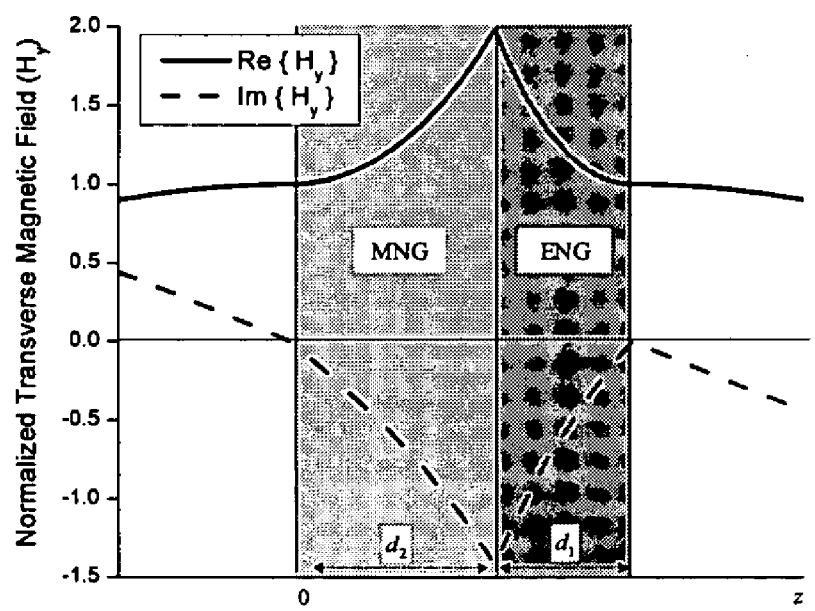
FIG. 10b illustrates the real and imaginary parts of the normalized transverse magnetic field $H_y$ as a function of z coordinate when a normally incident TM wave with a 45° angle of incidence impinges on a "matched pair" of lossless MNG-ENG slabs.

FIG. 10 illustrates a sketch of real and imaginary parts of the normalized total transverse magnetic field ($H_y$) as a function of the z coordinate when a TM wave with 45° angle of incidence impinges on a "matched pair" of lossless ENG-MNG slabs (FIG. 10a) and a "matched pair" of lossless MNG-ENG slabs (FIG. 10b). The parameters of these slabs, which are chosen such that the zero-reflection conditions are satisfied for the 45°-incident TM wave, are $$\varepsilon_{ENG} = -3\varepsilon_0, \mu_{ENG} = 2\mu_0, d_{ENG} = \frac{2\pi}{5|k_{ENG}|} \text{ and } \varepsilon_{MNG} = 2\varepsilon_0,$$

$$\mu_{MNG} = -1.19\mu_o, d_{MNG} = \frac{2\pi}{5.28|k_{MNG}|}.$$

The reflection, transmission and C's coefficients are found to be: R=0, T=1, $C_{1+}$=0.5∓0.42j, $C_{1-}$=0.5±0.42j, $C_{2+}$=1.85±1.54j, $C_{2-}$=0.14∓0.11j, where the upper (lower) sign refers to Case a (FIG. 10b). The value of $H_y$ at the front face of the pair (i.e., at z=0) is the same (both its real and imaginary parts) as that at the back face of the pair (i.e., at z=$d_1$+$d_2$), manifesting the complete tunneling of the incident wave through these lossless pairs, without any phase delay. The field values within the ENG-MNG pair, however, can attain high values at the interface between the two slabs (i.e., at z=$d_1$). Such unusual behavior of the field inside and outside the ENG-MNG pair (or MNG-ENG pair) can be justified by using the equivalent TL model, as will be shown below. FIG. 10 reveals the fact that the field variation inside the ENG-MNG pair can be different from that inside the MNG-ENG pair, even though the conditions of Equation 38 are the same for both matched pairs. In the former, the real and imaginary parts of $H_y$ inside the pair possess the same sign (FIG. 10a), while in the latter they have opposite signs (FIG. 10b).

Figure 11A:
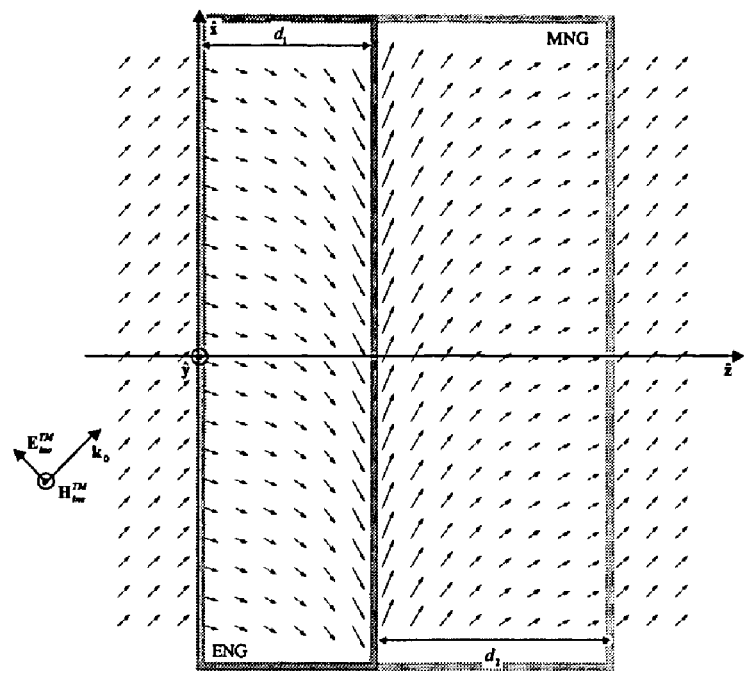
FIG. 11a illustrates the distribution of the real part of the Poynting vector inside and outside the matched pair of lossless ENG-MNG slabs for the TM plane wave at FIG. 11b illustrates the distribution of the real part of the Poynting vector inside and outside the matched pair of lossless MNG-ENG slabs for the TM plane wave at $$\theta_{R=0}^{TM} = 45°.$$
Figure 11B:
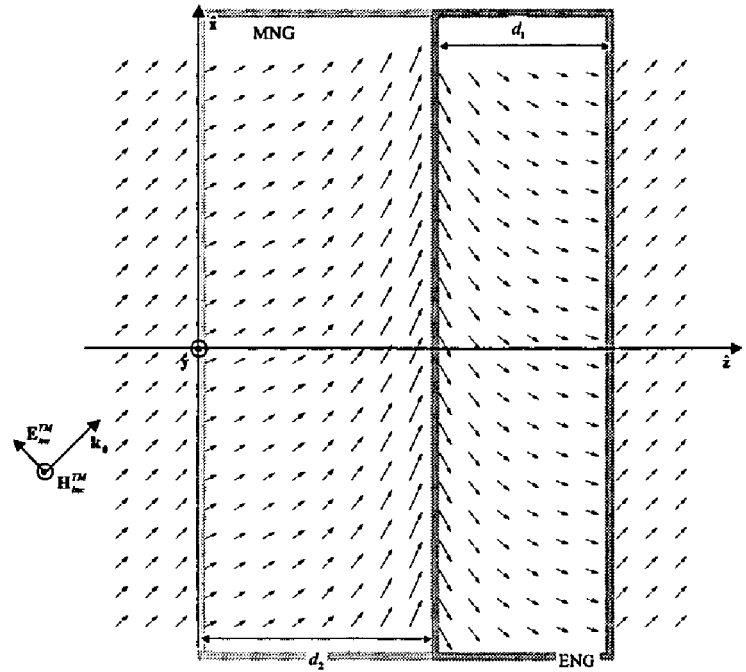

FIG. 11 illustrates the distribution of the real part of the Poynting vector inside and outside the matched pair of ENG-MNG (FIG. 11a) and MNG-ENG (FIG. 11b), for the TM plane wave at $$\theta_{R=0}^{TM} = 45°$$

described with respect to FIG. 10. Here one can see the complete flow of power through the matched pair of slabs, highlighting the "complete tunneling" phenomenon, transparency, and zero reflection property, an interesting observation given the fact that each of the ENG and MNG slabs by itself would not have allowed a sizeable fraction of incident power to go through. Pairing the lossless ENG and MNG slabs thus provides transparency for the incident wave at a particular angle, and leads to an interesting flow of the real part of the Poynting vector inside the paired slabs.

C. Characteristics of the Tunneling Conditions

Some of the salient features and characteristics of the zero-reflection and complete tunneling conditions given in Equations (35)–(38) will be described in this section.

1. Dependence on Material Parameters

From the derivation described in the previous section, it is clear that if one exchanges the order of the slabs, i.e., instead of ENG-MNG pair, to have the MNG-ENG pair, the above conditions will remain unchanged. However, as shown in FIGS. 10 and 11, the field structure and the flow of the real part of the Poynting vector inside the two slabs will be different.

The conditions given in Equations (35)–(38) are obtained for the ENG-MNG pair (or an MNG-ENG pair). However, when an ENG slab is next to another ENG slab, the zero-reflection conditions will obviously never be achieved. When the ENG slab is juxtaposed even with a DPS or a DNG slab, the zero-reflection condition may not be satisfied either, for the case where the wave inside the DPS or DNG slab is assumed to be a propagating wave. This is due to the fact that in such a case, $Z_1$ and $\beta_1$ of the ENG would be purely imaginary, whereas $Z_2$ and $\beta_2$ of the DPS or DNG would be purely real, and thus one cannot achieve a real $Z_{in}$ in Equation (34). However, if $k_x$ is chosen such that the TM wave inside the DPS or DNG slab is an evanescent wave, according to the equivalent TL models shown in Table 1, the DPS or DNG slab can be treated as an equivalent MNG or ENG slab (for the TM mode), respectively, and a zero-reflection condition may, under certain conditions, be achievable.

The phenomenon of complete transmission through an inhomogeneous layer with a particular permittivity profile and also through multilayered structures made of several layers of alternating plasma (with negative epsilon) and conventional dielectric (with positive epsilon) materials have been analyzed in the past by C.-H. Chen et al. However, the tunneling effect in those structures is due to the phenomenon of "leaky resonance" in which any positive-permittivity slab is placed between at least two negative-permittivity layers. In the problem presented here, the tunneling phenomenon is different in that it occurs for a pair of slabs consisting of only one ENG and one MNG layer.

The conditions derived in Equation (38) do not depend on the material parameters of the two identical external regions, but only on the parameters of the ENG and MNG slabs. In fact, as will be shown in the next section, these zero-reflection conditions are not due to the matching between the slabs with the external regions, but instead only due to the interaction of the ENG and MNG slabs with each other, resulting in a "resonance" phenomenon. However, if the two outside semi-infinite regions are filled by two different media, the zero-reflection condition will change, and will in general depend on the external parameters as well. It is important to note that even in this general case Equation (38) still represents a "transparency" condition, depending only on the internal interaction of the two slabs with themselves. So when the conditions in Equation (38) are satisfied, the paired slabs will become "transparent" to the incoming wave, and if the two outside media are the same, zero reflection will be achieved.

Moreover, it is interesting to note that the zero-reflection condition can also be satisfied by a pair of lossless DPS and DNG layers, if $Z_1=Z_2$ and $\beta_1 d_1 = -\beta_2 d_2$ for a given angle of incidence and polarization. This is possible, since it is known from the teachings of Veselago that in DNG media the direction of phase velocity is opposite to the direction of the Poynting vector, so the condition $\beta_1 d_1 = -\beta_2 d_2$ is achievable. The condition $Z_1=Z_2$ is also attainable. Such a DPS-DNG bilayer structure will also be transparent to an incident wave with a specific angle and polarization. The correspondence between the ENG-MNG pair and the DPS-DNG pair will be discussed in more detail below. In relation to this, it is worth noting that Zhang and Fu have shown that the presence of a DNG layer (or layers) can lead to unusual evanescent photon tunneling when such DNG layers are next to conventional layers. Their case can be considered as a special solution to Equation (37) above, since as shown in Table 1 the TL models for the evanescent waves in DPS and DNG layers are similar to those of MNG and ENG layers (for TM case) or ENG and MNG layers (for TE case), respectively.

2. Dependence on Slab Thicknesses

The conditions shown in Equation (38) do not restrict the sum of the thicknesses of the two slabs, $d_1+d_2$. One could thus have thick or thin layers of lossless ENG and MNG materials as long as the above conditions are satisfied in order to achieve transparency. When dissipation is present, the sum of the thicknesses can play a role, as will be discussed below.

3. "Brewster-Type" Angle

The zero-reflection conditions given in Equation (38) in general depend on the value of $k_x$. If the parameters of the ENG and MNG slabs are first chosen, one may be able to find a real value of $k_x$ satisfying Equation (38). If such a real $k_x$ exists and if it satisfies the inequality $k_x^2 \leq \omega^2 \mu_0 \epsilon_0$, then it will be related to a particular angle of incidence of the TM wave for which the wave is "tunneled" through the lossless ENG-MNG bilayer structure completely and without any reflection. This "Brewster-type" angle can be expressed as:

$$\theta_{R=0}^{TM} \equiv \arcsin\sqrt{\frac{\varepsilon_1\varepsilon_2(\varepsilon_2\mu_1 - \varepsilon_1\mu_2)}{\mu_o\varepsilon_o(\varepsilon_2^2 - \varepsilon_1^2)}} \quad (39)$$

It should be remembered that in the above relation, $\epsilon_1<0$, $\mu_1>0$, $\epsilon_2>0$, and $\mu_2<0$ Obviously, an arbitrarily chosen set of such parameters for the pair of ENG and MNG slabs may not always provide one with an angle $\theta_{R=0}^{TM}$ in the real physical space. In order to have such an angle, the following necessary condition should be fulfilled $$\frac{1}{\varepsilon_1\varepsilon_2} < \frac{\varepsilon_2\mu_1 - \varepsilon_1\mu_2}{\mu_o\varepsilon_o(\varepsilon_2^2 - \varepsilon_1^2)} \leq 0 \quad \text{for } TM \text{ case.} \quad (40)$$

As an aside, it is worth noting that the above condition coincides with the one required for having a Zenneck wave at the interface between semi-infinite DPS and DNG media (and also semi-infinite ENG and MNG media).

4. "Conjugate Matched Pair" of ENG-MNG Slabs

Of the infinite set of parameters satisfying Equation (38), the particular set $\epsilon_1=-\epsilon_2$, $\mu_1=-\mu_2$, $d_1=d_2$ deserves special attention. Such a pair of lossless ENG and MNG slabs is called herein the "conjugate matched pair" or "strictly matched pair," in contradistinction with the term "matched pair" defined earlier that referred to an ENG-MNG pair that satisfies the general condition (38) for a specific value of $k_x$. For the lossless conjugate matched pair, the reflection and transmission coefficients and the coefficient C's in the field expressions inside the slabs are simplified and expressed as:

$$R^{TM}=0, \quad T^{TM}=1, \quad C_{1\pm}^{TM}=\frac{1}{2}\pm j\frac{\varepsilon\sqrt{\omega^2\mu_0\varepsilon_0-k_x^2}}{2\sqrt{k_x^2-\omega^2\mu\varepsilon}}, \quad C_{2\pm}^{TM}=e^{\pm\sqrt{k_x^2-\omega^2\mu\varepsilon}\,d}C_{1\pm}^{TM} \quad (41)$$

-continued $$R^{TE} = 0, \quad T^{TE} = 1, \quad C_{1\pm}^{TE} = \frac{1}{2} \pm j\frac{\mu\sqrt{\omega^2\mu_0\varepsilon_0 - k_x^2}}{2\sqrt{k_x^2 - \omega^2\mu\varepsilon}}, \quad C_{2\pm}^{TE} = e^{\pm\sqrt{k_x^2 - \omega^2\mu\varepsilon}\,d}C_{1\pm}^{TE}$$

where $\epsilon \equiv \epsilon_1 = -\epsilon_2$, $\mu \equiv \mu_1 = -\mu_2$, and $d \equiv d_1 = d_2$. For this case, the zero-reflection and complete tunneling through the slabs occurs for any value of $k_x$ and any angle of incidence (and for any polarizations, although only TM case is discussed here), hence $T^{TM}=1$. Moreover, no effective phase delay due to the length $d_1+d_2$ is added to the wave propagation, i.e., the phase of the transmitted wave at $z=d_1+d_2$ is the same as the phase of the incident wave at $z=0$. Furthermore, the coefficients $C_{1+}^{TM}$ and $C_{1-}^{TM}$ in the first slab have the same magnitude, which means that, according to Equation (32), the decaying and growing exponential terms in $H_y$ have the same magnitude at $z=0^+$. As the observation point moves through the first slab and approaches the interface between the first and second slabs, the magnitude of $H_y$ would be dominated by the growing exponential term. In the second slab, however, the magnitude of $H_y$ is dominated by the decaying exponential, as the last two relations in Equation (41) require. Therefore, the field inside the conjugate matched pair of ENG-MNG slabs is predominantly concentrated around the interface between the two slabs. This behavior can be seen from FIG. 12a.

Figure 12A:
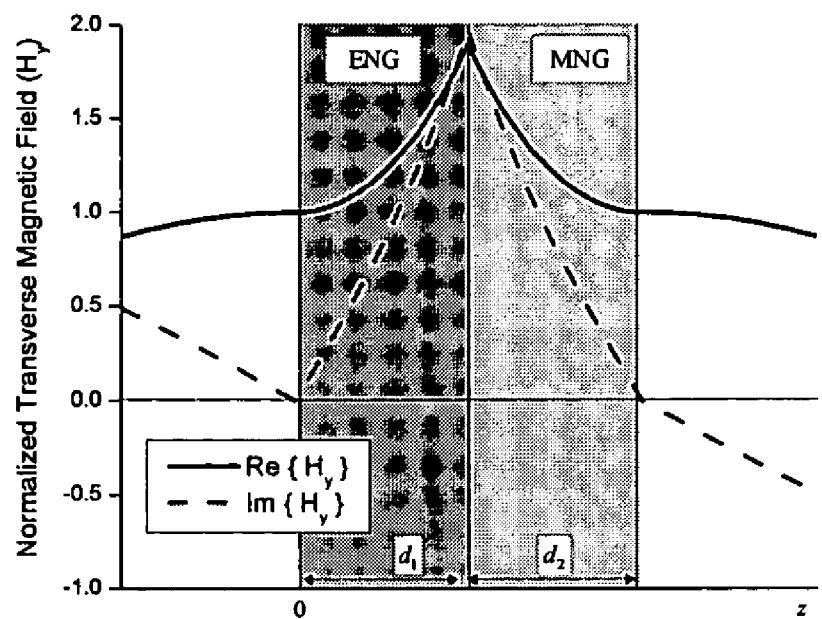
FIG. 12a illustrates a sketch of real and imaginary parts of the normalized total transverse magnetic field as a function of z coordinate, when a normally incident TM wave impinges on a "conjugate matched pair" of lossless ENG-MNG slabs.
Figure 12B:
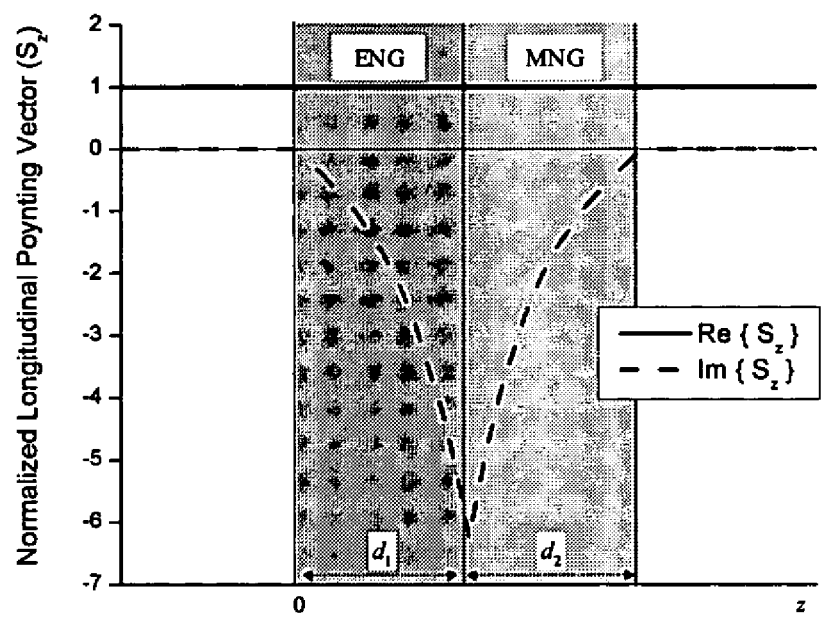
FIG. 12b illustrates the distribution of the real and imaginary part of the normalized Poynting vector inside and outside of the structure of FIG. 12a, where the normalization is with respect to the value of the Poynting vector of the incident wave.

FIG. 12a illustrates a sketch of real and imaginary parts of the normalized total transverse magnetic field as a function of z coordinate, when a normally incident TM wave impinges on a "conjugate matched pair" of lossless ENG-MNG slabs, while FIG. 12b illustrates the distribution of the real and imaginary part of the normalized Poynting vector inside and outside of this structure. The normalization is with respect to the value of the Poynting vector of the incident wave. It is noted that the real part of the normalized Poynting vector is uniform and equals unity through the paired slabs, implying the complete tunneling of the incident wave, whereas the imaginary part of the Poynting vector is only present inside the pair and has its peak at the interface between the two slabs. The parameters of the ENG and MNG slabs, which are chosen such that the conjugate matched pair conditions are satisfied, are $\epsilon_{ENG}=-3\epsilon_0$, $\mu_{ENG}=2\mu_0$, $\epsilon_{MNG}=3\epsilon_0$, $\mu_{MNG}=-2\mu_0$ and $$d_1 = d_2 = \frac{2\pi}{5|k_1|}.$$

The reflection, transmission and C's coefficients for the pair are found to be R=0, T=1, $C_{1\pm}=0.5\mp0.61j$, $C_{2+}=1.76+2.15j$, $C_{2-}=0.14-0.17j$.

The real and imaginary parts of the Poynting vector for a wave tunneling through these conjugate matched pair of ENG and MNG slabs is shown in FIG. 12b, where the case of a normally incident wave is considered. From FIG. 12b it can be seen the real part of the Poynting vector is uniform and equals unity through the structure, indicating the complete tunneling phenomenon. The imaginary part of the Poynting vector, on the other hand, is zero outside the paired slabs, it is only present inside the slab, and has its peak at the interface between the two slabs. This exhibits the presence of stored energy in these paired slabs, which, as will be explained below, can be regarded as a "resonance" phenomenon.

5. Variation in Angle of Incidence for the Matched Pair of ENG-MNG Slabs

For a given set of parameters for the ENG and MNG slabs, the general matched pair condition for zero reflection and transparency may be satisfied if the TM incident wave can have a specific incident angle, $$\theta_{R=0}^{TM},$$

given in Equation (39). This implies that when an ENG-MNG pair is designed to be transparent for a TM wave with a specific angle of incidence, this pair will not be transparent to other angles of incidence. Recall that the zero reflection and transparency condition for the more specific conjugate pair is independent of the angle of incidence. The sensitivity of reflection coefficient for the general matched pair to this angular variation will now be explored. A variation $\delta k_x$ in the transverse wave number $k_x$ causes a perturbation in the zero-reflection conditions, which can be expressed, to a first-order approximation, as $$jX_{ENG} + jX_{MNG} \cong \frac{jk_x\delta k_x}{\omega^2 X_{ENGm}}\left(\frac{1}{\varepsilon_1^2} - \frac{1}{\varepsilon_2^2}\right)$$

and $$\beta_{ENG}d_1 - \beta_{MNG}d_2 \cong \frac{k_x\delta k_x(d_2^2 - d_1^2)}{\beta_{ENGm}d_1},$$

where $X_{ENGm}$, $\beta_{ENGm}$ and $\beta_{MNGm}$ are the values satisfying the matched condition (38), i.e. for $\delta k_x=0$. The reflection sensitivity on the angular variation, therefore, increases with $k_x$.

Moreover, the reflectivity increases with the difference between the constitutive parameters in the two media and the total thickness of the structure. FIG. 13 shows the magnitude of the reflection coefficient for the ENG-MNG pair with several sets of parameters designed to make the pair transparent at $$\theta_i = \frac{\pi}{4}.$$

Figure 13A:
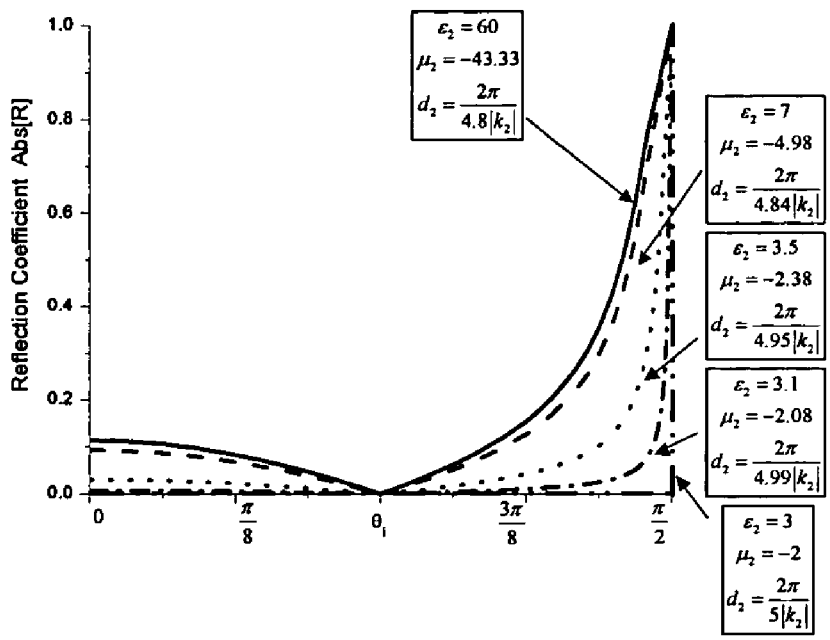
FIG. 13a illustrates the magnitude of the reflection coefficient for a thin slab in response to variations of the angle of incidence for the lossless ENG-MNG pair with several sets of parameters designed to make the pair transparent at $$\theta_i = \frac{\pi}{4}.$$
Figure 13B:
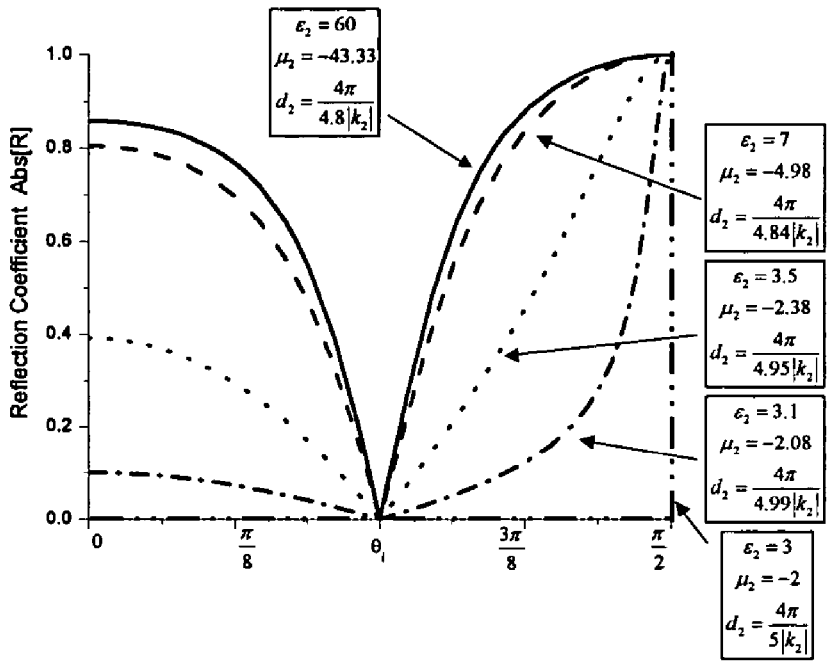
FIG. 13b illustrates the magnitude of the reflection coefficient for a thick slab in response to variations of the angle of incidence for the lossless ENG-MNG pair with several sets of parameters designed to make the pair transparent at $$\theta_i = \frac{\pi}{4}.$$

As illustrated in FIG. 13, the reflection coefficient is sensitive to variation of the angle of incidence. The magnitude of the reflection coefficient from matched pairs of lossless ENG-MNG is plotted as a function of angle of incidence. An ENG slab with parameters $\epsilon_{ENG}=-3\epsilon_0$, $\mu_{ENG}=2\mu_0$ and $$d_{ENG} = \frac{2\pi}{5|k_{ENG}|}$$

for FIG. 13a and $$d_{ENG} = \frac{4\pi}{5|k_{ENG}|}$$

for FIG. 13b is first selected. Then, the parameters of the MNG slab are chosen such that the pair satisfies the zero-reflection condition (Equation (38)) for the TM wave with 45° angle of incidence. Since there are two relations in Equation (38), but there are three parameters ($\epsilon_{MNG}$, $\mu_{MNG}$, $d_{MNG}$) to determine for the MNG slab, there is one degree of freedom. As a result, in principle, for a given ENG the choice of MNG is not unique in order to form a matched ENG-MNG pair. A family of curves for several pairs of matched ENG-MNG slabs is shown. For each pair, the reflection coefficient is then evaluated as a function of angle of incidence. The values of parameters for the MNG slab are shown near each plot (the values of the permittivity and permeability of the MNG slab are shown with respect to $\epsilon_0$ and $\mu_0$). The variation of the reflection coefficient with angle of incidence is less sensitive for thinner slabs (FIG. 13a) than for the thicker ones (FIG. 13b).

When the media parameters are chosen closer to the conjugate matched pair conditions, the reflectivity remains low for a wider set of angles, whereas for larger values of $$\left| \frac{1}{\varepsilon_1^2} - \frac{1}{\varepsilon_2^2} \right|,$$

the reflectivity increases as the angle of incidence deviates from the design angle $$\theta_{R=0}^{TM}.$$

Such dependence on the difference between the constitutive parameters saturates for large $\epsilon_2$, as seen from FIG. 13 and the first-order approximation. The reflectivity will depend more on the total thickness of the structure. As can be seen from FIG. 13, the reflectivity from a thinner structure (FIG. 13a) is less sensitive to the angular variation than that from the thicker pair (FIG. 13b).

6. Presence of Material Loss

In finding the matched pair conditions given in Equations (36)–(38) and the conjugate matched pair conditions, the inventors considered lossless ENG and MNG slabs. Obviously, with the presence of loss, perfect transparency and zero reflection is not achievable due to the mismatch between the paired slabs and the outside region, as well as the absorption in the materials. It is important to explore the sensitivity of the wave tunneling phenomenon on the value of $\epsilon_i$ or $\mu_i$. Imagine a conjugate matched pair of ENG-MNG slabs, with complete tunneling, i.e., then the zero reflection for the lossless case can be achieved. FIG. 14 shows how the reflection and transmission coefficients vary with $\epsilon_i$ and/or d.

Figure 14A:
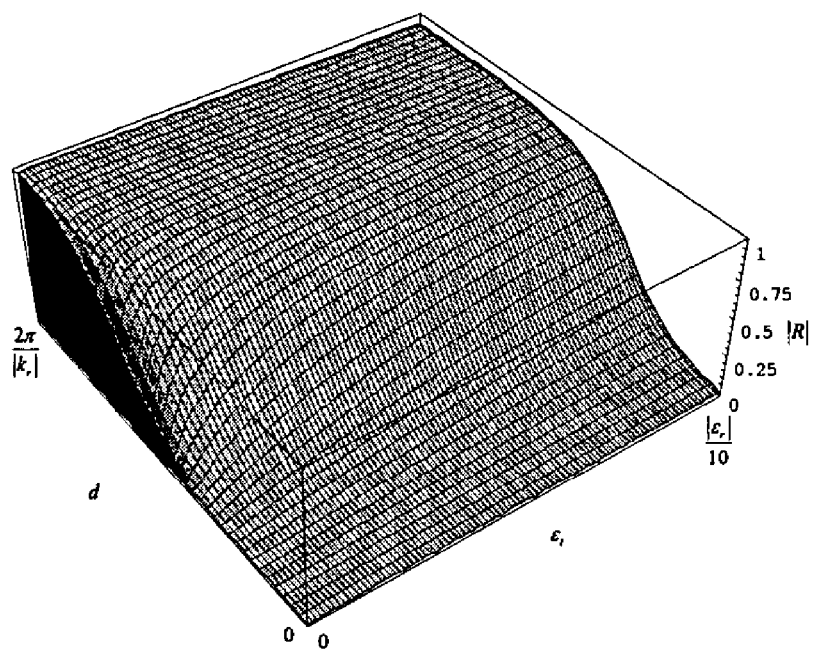
FIG. 14a illustrates the magnitude of the reflection coefficient for the conjugate matched pair of ENG-MNG slabs shown in FIG. 12a when the loss mechanism is introduced in the permittivity of both slabs as the imaginary part of the permittivity.
Figure 14B:
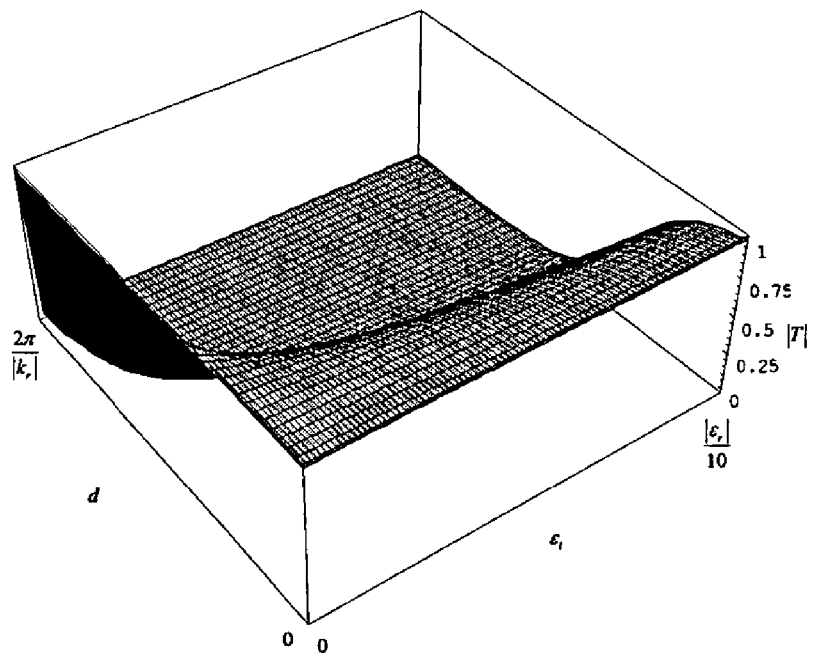
FIG. 14b illustrates the magnitude of the transmission coefficient for the conjugate matched pair of ENG-MNG slabs shown in FIG. 12a when the loss mechanism is introduced in the permittivity of both slabs as the imaginary part of the permittivity.

In particular, FIG. 14 illustrates the magnitude of the reflection coefficient (FIG. 14a) and the transmission coefficient (FIG. 14b) for the conjugate matched pair of ENG-MNG slabs shown in FIG. 12a when the loss mechanism is introduced in the permittivity of both slabs as the imaginary part of the permittivity. (Normal incidence is assumed here.) It is noted that the sensitivity of the reflection and transmission coefficients to the presence of loss (i.e., on $\epsilon_i$) depends on the value of the thickness d; i.e., the reflection and transmission coefficients will become more sensitive to variations with respect to $\epsilon_i$ as the value of d becomes larger.

In FIG. 14, it is assumed that $\mu_i=0$, while $\epsilon_i$ is allowed to be non-zero. (Analogous results are obtained if $\epsilon_i=0$, and $\mu_i\neq 0$) Note that for $\epsilon_i=0$, the reflection coefficient is zero for all values of d, representing the case of a conjugate matched pair. However, when $\epsilon_i$ becomes non-zero, the reflection coefficient may attain non-zero values, and the sensitivity of the reflection coefficient on $\epsilon_i$ depends on the value of d: the larger the value of d, the more sensitive the reflection coefficient will be with respect to $\epsilon_i$. This would be expected from physical arguments. For small values of d, the reflection coefficient is not too sensitive to the presence of small $\epsilon_i$. In addition, one can also determine how the transmission of a wave through the pair is affected by the loss.

Figure 15:
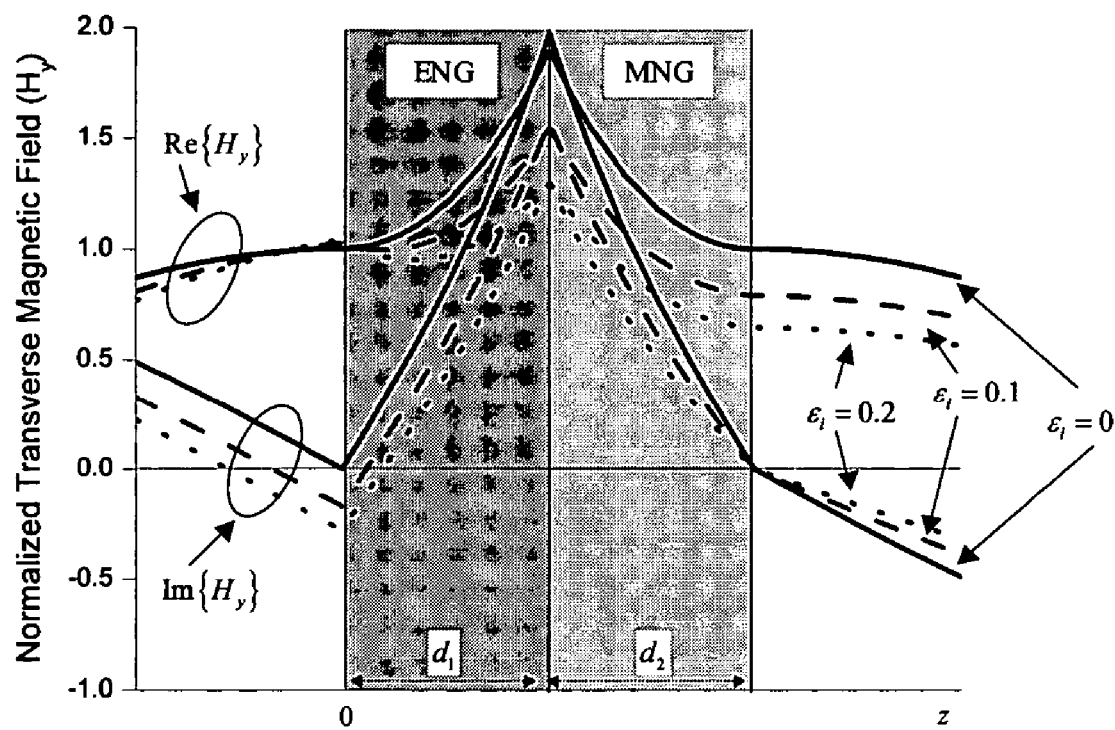
FIG. 15 illustrates the effect of loss on the field distribution in a conjugate matched ENG-MNG pair excited by a normally incident plane wave.

FIG. 15 illustrates for the TM case the behavior of the total magnetic field inside and outside of the ENG-MNG pair, when $\epsilon_i$ and $\mu_i$ are allowed to be non-zero. In particular, FIG. 15 illustrates the effect of loss on the field distribution in a conjugate matched ENG-MNG pair excited by a normally incident plane wave. FIG. 15 shows the distribution of the real and imaginary parts of the total transverse magnetic field inside and outside of the conjugate matched pair of ENG-MNG slabs considered in FIG. 12a, when the loss is present in the form of the imaginary part of the permittivity in both slabs. Obviously, for larger values of $\epsilon_i$ and $\mu_i$, more absorption occurs in the structure, resulting in lower values of the transmitted wave.

D. Resonance in the ENG-MNG Bilayer

Figure 16A:
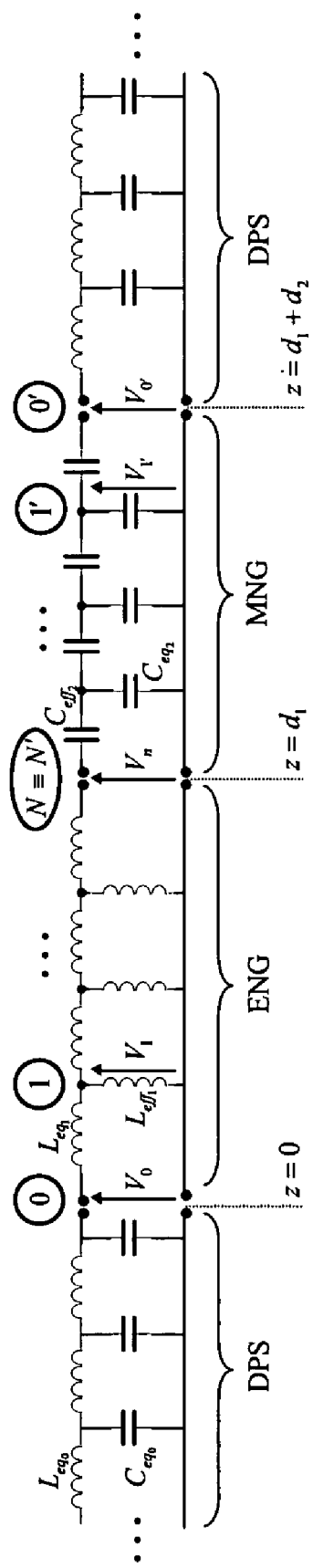
FIG. 16 illustrates equivalent transmission line models with corresponding distributed series and shunt elements, representing the TM wave interaction with (a) a pair of ENG-MNG slabs, and (b) a pair of DPS-DNG slabs.

As listed in Table 1, the evanescent TM wave propagation in the ENG and MNG slabs can be modeled as equivalent L-L and C-C transmission lines, respectively. Therefore, the ENG-MNG pair can be modeled using the TL, as shown in FIG. 16a. In FIG. 16a, this pair is shown as the cascaded L-L and C-C transmission lines in the range $0<z<d_1$ and $d_1<z<d_1+d_2$, respectively. The two semi-infinite regions of free space, $z<0$ and $z>d_1+d_2$, can of course be modeled as the standard L-C transmission lines for the case of a propagating TM wave.

Figure 16B:
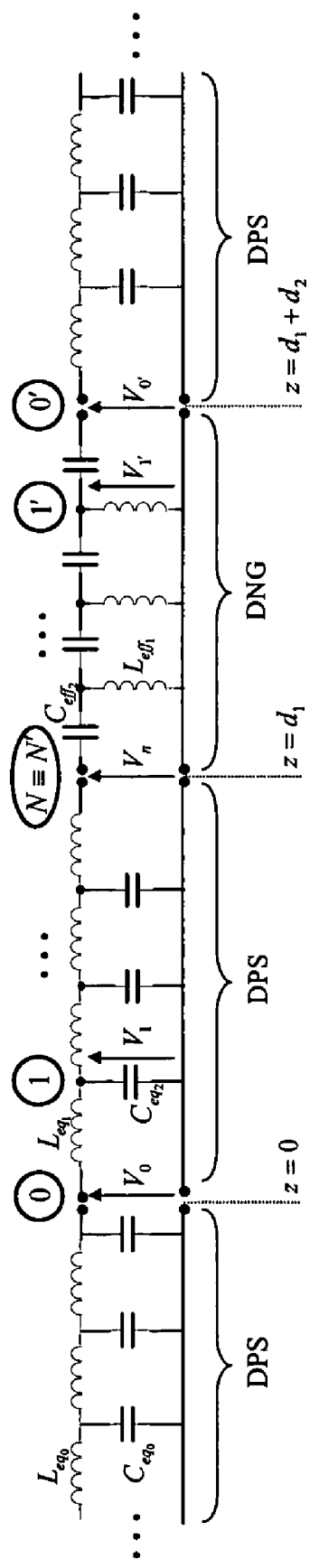

FIG. 16 illustrates the equivalent transmission line models with corresponding distributed series and shunt elements, representing the TM wave interaction with a pair of ENG-MNG slabs (FIG. 16a), and a pair of DPS-DNG slabs (FIG. 16b). In each section, the TL consists of many infinitesimally thin cells containing series and shunt elements. As shown in Table 1, the choice of such equivalent series and shunt elements in the TL model depends on the material parameters in each slab, the polarization of the wave (here only TM polarization is considered), and whether the wave is propagating or evanescent.

It is interesting to observe how the TL section between $z=0$ and $z=d+d_2$ affects the propagation through the line from left to right. First assume that the L-L line and C-C line are divided into many small infinitesimal segments. The number of such infinitesimal segments is taken to be $N=N'>>1$, thus the length of each segment in the L-L and C-C lines is $d_1/N$ and $d_2/N'$, respectively. Each segment has certain amounts of series impedance and shunt admittance, which can be obtained by multiplying, respectively, the segment length by the series impedance per unit length and shunt admittance per unit length. Looking at the nodes N−1 and N′−1, and referring to FIG. 16a, the total impedance between these two nodes can be written as:

$$Z_{N-1,N'-1} = j\omega L_{eq1}\frac{d_1}{N} + \frac{1}{j\omega C_{eff2}}\frac{d_2}{N}. \quad (42)$$

As described earlier, $C_{eff2}$ is defined as $$C_{eff2} \equiv -\frac{1}{\omega^2 L_{eq2}}.$$

By substituting the values of $L_{eq1}$ and $L_{eq2}$ for the TM case the above equation can be re-written as:

$$Z_{N-1,N'-1} = \frac{jA_1\omega}{N}\left[\left(1-\frac{k_x^2}{\omega^2\mu_1\varepsilon_1}\right)\mu_1 d_1 + \left(1-\frac{k_x^2}{\omega^2\mu_2\varepsilon_2}\right)\mu_2 d_2\right]. \quad (43)$$

Taking into account the conditions given in Equation (38) for a matched pair and considering the fact that $\mu_1\varepsilon_1<0$ and $\mu_2\varepsilon_2<0$ after some mathematical manipulations, $Z_{N-1,N'-1}=0$ is obtained. This implies that the series reactive elements between the nodes N−1 and N′−1 are in resonance, and thus these two nodes have the same voltage, i.e., $V_{N-1,N'-1} \equiv V_{N-1}-V_{N'-1}=0$. From this, one can assert that the shunt element $L_{eff1}$ at node N−1 (i.e. between node N−1 and the ground) and the shunt element $C_{eq2}$ at node N′−1 are now in parallel. The total admittance of these two parallel shunt reactive elements is:

$$Y_{N-1/N'-1, \text{ ground}} = \frac{1}{j\omega L_{eff1}}\frac{d_1}{N} + j\omega C_{eq2}\frac{d_2}{N}. \quad (44)$$

Following similar steps and considering that $$L_{eff1} \equiv -\frac{1}{\omega^2 C_{eq1}}, Y_{N-1/N'-1, \text{ ground}} = 0,$$

which implies that the two shunt elements are in resonance. Consequently, the current flowing in the inductive element $L_{eq1}$ between the nodes N−2 and N−1 is the same as the current flowing in the capacitive element $C_{eff2}$ between the nodes N′−1 and N′−2. These two elements are then effectively in series, since $Y_{n-1/n'-1,\text{ground}}=0$. Repeating the above steps it can be shown that these two elements are in resonance as well, i.e., $Z_{N-2,N'-2}=0$, resulting in $V_{N-2,N'-2} \equiv V_{N-2}-V_{N'-2}=0$. Following this procedure away from the middle node N≡N′ towards the end nodes 0 and 0′, such resonance behavior occurs for every pair of series and shunt elements, and thus the current and voltage at the node 0 are the same at those at node 0′, i.e.:

$$V_{z=0}=V_{z=d_1+d_2} \text{ and } I_{z=0}=I_{z=d_1+d_2} \quad (45)$$

From this, one can conclude that the input impedance at z=0 (looking into the right in FIG. 16a) is the same as the input impedance at $z=d_1+d_2$ (looking into the right). Therefore, the segment of the TL between z=0 and $z=d_1+d_2$, which represents the matched pair of lossless ENG and MNG slabs, is in resonance and has become "transparent" to the incoming wave that is effectively "tunneling" through this segment with no effective phase change. Although the lossless ENG or MNG slab by itself does not allow the perfect complete tunneling of the incoming wave through it, when an ENG slab is juxtaposed with an MNG slab with the properly selected set of parameters, a resonant structure which provides transparency and zero reflection to the incoming wave is obtained. If the slab parameters are chosen to have a conjugate matched lossless pair, then an incident wave with any angle of incident and polarization can tunnel through the pair. From a TL and circuit element point of view, one can also see that with an individual one of the L-L or C-C transmission lines, the current and voltage will decay along such a line. However, when the L-L and the C-C segments are joined to represent the ENG-MNG pair, a resonant structure in which the current and voltage behave quite differently is found.

In order to intuitively understand and interpret the field behavior inside the ENG-MNG pair, the current in each series element in the resonant segment between z=0 and $z=d_1+d_2$ in FIG. 16a is evaluated. Considering the fact that at z=0 there is no reflection, and thus $V_{z=0}/I_{z=0}=Z_0$, where $Z_0$ is the characteristic impedance of the TL before the point z=0, the following expression for the current in the series elements between nodes M and M+1, where $0 \leq M \leq N-1$ is found:

$$I_{M/M+1}=I_{M/M+1,r}+jI_{M/M+1,i}$$

where $$I_{M/M+1,r} = \quad (46)$$

$$\frac{I_{z=0}}{L_{eff1}^M 2^{M+1}}\left[\left(1+\frac{\sqrt{L_{eq1}}}{\sqrt{L_{eq1}+4L_{eff1}}}\right)a_1^M + \left(1-\frac{\sqrt{L_{eq1}}}{\sqrt{L_{eq1}+4L_{eff1}}}\right)a_2^M\right]$$

$$I_{M/M+1,i} = \frac{I_{z=0}}{2^M L_{eff1}^M}\frac{Z_o}{\omega L_{eq1}}\frac{\sqrt{L_{eq1}}}{\sqrt{L_{eq1}+4L_{eff1}}}(a_1^M - a_2^M)$$

with $a_1$ and $a_2$ being shorthand for $$a_{\frac{1}{2}} \equiv L_{eq1} + 2L_{eff1} \mp \sqrt{L_{eq1}(L_{eq1}+4L_{eff1})}.$$

If for the special case where $L_{eq1}=L_{eff1}\equiv L$, then the above equation can be simplified as:

$$I_{M/M+1,r} = I_{z=0}\frac{(3+\sqrt{5})^M(\sqrt{5}+1)+(3-\sqrt{5})^M(\sqrt{5}-1)}{2^{M+1}\sqrt{5}} \quad (47)$$

$$I_{M/M+1,i} = I_{z=0}\frac{(3+\sqrt{5})^M-(3-\sqrt{5})^M}{2^M\sqrt{5}}\frac{Z_o}{\omega L_{eq1}}$$

The corresponding expressions for the current in series elements between the consecutive nodes M′ and M′+1, where 0′<M′<N′−1 is a node in the C-C TL section, can also be found by simply making the following substitutions $L_{eq1} \to 1/\omega^2 C_{eff2}$, $L_{eff1} \to 1/\omega^2 C_{eq2}$ in Equations (46) and (47). The currents $I_{M/M+1}$ and $I_{M'/M'+1}$ increase with power of M, when M increases from 0 to N−1. The same considerations can be made for the corresponding expressions for the voltages at the nodes M and M'. Their behavior is very similar. Consequently, in this equivalent circuit model, it may be observed that the current and voltage distributions within this resonant segment are concentrated around the node N≡N' and then they decrease in magnitude as one approaches to the edges of the segment, i.e., towards the nodes 0 and 0'. This is obviously consistent with what was obtained for the field behavior using the wave theory, as shown in FIGS. 10 and 12.

It is worth noting that the resonant behavior of the ENG-MNG segment of the line can also be interpreted in terms of the impedance mismatch between the two TL sections at the node N≡N'. As listed in Table 1, the characteristic impedance of the L-L line representing the ENG slab (for the TM mode) is a positive imaginary quantity, $Z_{L-L} = jX_{L-L}$ with $X_{L-L} > 0$ while the one for the C-C line for the MNG slab is a negative imaginary quantity, $Z_{C-C} = jX_{C-C}$ with $X_{C-C} < 0$. If one treats the evanescent wave in the ENG slab as an "incoming" wave impinging on the boundary between the ENG and MNG slabs, the Fresnel "reflection coefficient" for such an incident evanescent wave can then be written as $R = (Z_{C-C} - Z_{L-L})/(Z_{C-C} + Z_{L-L})$. When the ENG-MNG pair is a matched pair, according to the conditions (38), $Z_{L-L} = -Z_{C-C}$, resulting in an infinitely large reflection coefficient! This should not cause any concern, because (1) this is a reflection coefficient between an "incident" evanescent wave and "reflected" evanescent wave, which each by itself does not carry any real power; and (2) the "singular" nature of this reflection coefficient implies that there is a resonant "natural" mode for this segment of the line acting effectively as a "cavity resonator".

E. Correspondence Between the ENG-MNG Pair and the DPS-DNG Pair

Fredkin and Ron have shown that a layered structure with alternating slabs of negative-epsilon and negative-mu materials may effectively behave as a DNG material, because the effective group velocity in such a structure would be anti-parallel with the effective phase velocity. Here, using the TL model, the inventors present a different analogy between the ENG-MNG pair and the DPS-DNG pair. The transmission line model shown in FIG. 16*a* can be modified to represent the TM wave interaction with a lossless DPS-DNG bilayer structure. Using the information given in Table 1, one can model the DPS-DNG pair as the transmission line shown in FIG. 16*b*. One can immediately see that, like the case of ENG-MNG pair, if the parameters of the DPS-DNG pair are chosen such that the zero-reflection conditions are satisfied, the resonance phenomenon between the series reactive elements and between the shunt reactive elements in infinitesimal sections of the TL will occur. As a result, one can again have $V_{z=0} = V_{z=d_1+d_2}$ and $I_{z=0} = I_{z=d_1+d_2}$, suggesting that the matched pair of lossless DPS and DNG slabs can be in resonance and may become "transparent" to the incoming wave. In this sense, the ENG-MNG pair may act in a similar manner as the DPS-DNG pair. However, one should remember that the behavior of the wave propagation within these two pairs is different: in the ENG-MNG pair, the fields are the sum of evanescent waves, whereas in the DPS-DNG pair, one can have propagating waves. Since in the small-argument approximation, trigonometric sinusoidal and hyperbolic sinusoidal functions may appear somewhat similar, for a short range of distance the evanescent field function may approximately resemble those of the propagating wave. One can then anticipate that a "thin" ENG-MNG pair may essentially function like a thin DPS-DNG pair. This point is pictorially illustrated in FIG. 17.

Figure 17:
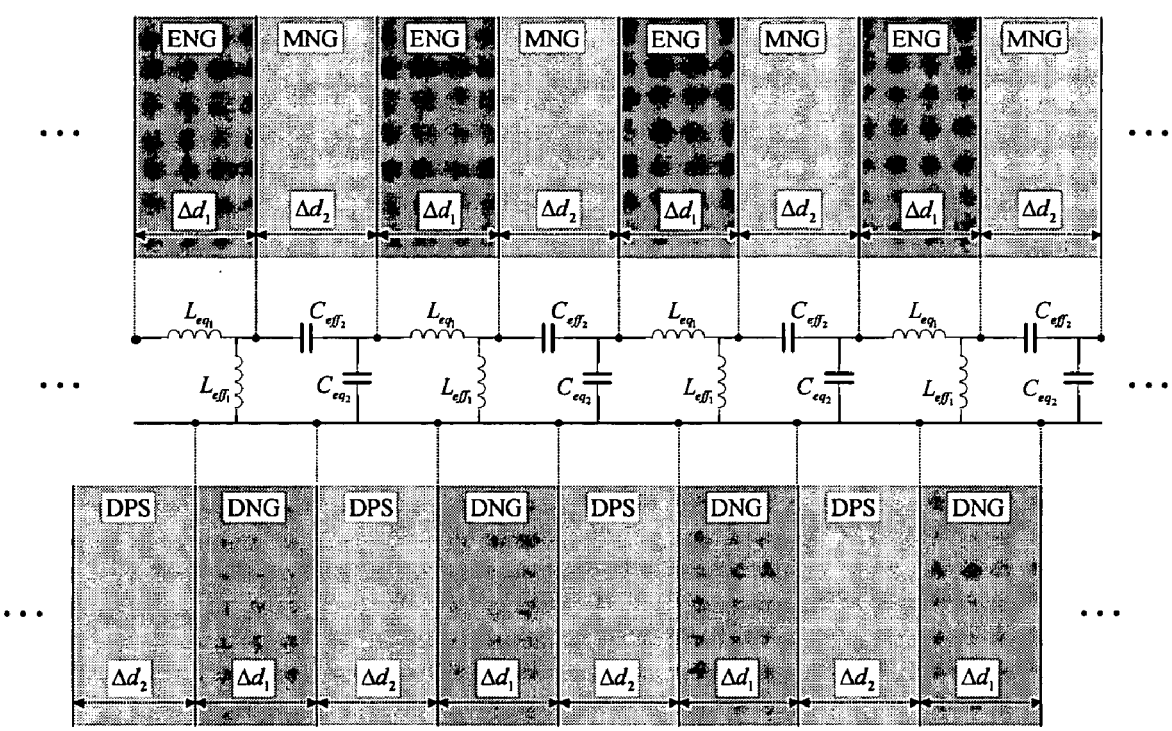
FIG. 17 illustrates the correspondence between the cascaded "thin" layers of ENG-MNG slabs and the cascaded "thin" layers of DPS-DNG slabs, using the concept of equivalent transmission lines.

With respect to FIG. 17, one may imagine cascaded "thin" layers of identical lossless ENG-MNG pairs. The layers are assumed to be electrically thin with thicknesses $\Delta d_1$ and $\Delta d_2$. The equivalent cascaded pair, L-L and C-C, transmission line model of this structure is also shown in FIG. 17. It can be seen from this model that if the layers are assumed to be thin enough, these cascaded pairs can also be viewed as cascaded pairs of L-C and C-L lines, thus representing cascaded pairs of DPS-DNG layers. Specifically, notice that each segment of $L_{eq1}$-$L_{eff1}$ is sandwiched between the two segments of $C_{eff2}$-$C_{eq2}$, and vice versa. Therefore, for thin layers the grouping of $L_{eq1}$-$C_{eq2}$ and $C_{eff2}$-$L_{eff1}$ together can be assumed instead, representing thin DPS and DNG layers, respectively. If the matched pair conditions, Equation (38), for the ENG-MNG pair are satisfied, one would get the tunneling effect for the entire set of cascaded ENG-MNG pairs, since all these pairs behave as resonant structures individually. If the matched pair conditions are fulfilled, the same can be said about the set of cascaded pairs of DPS-DNG slabs for the evanescent tunneling.

As noted above, analogous behaviors can also be exploited in guided-wave structures. As was the case with the paired parallel DPS-DNG layers inserted in a parallel-plate cavity or waveguide structure, the matched ENG-MNG paired parallel slabs could also support a resonant mode when they are placed between two parallel metallic walls. Furthermore, the phase of the field at the back face of this matched pair is also the same as the phase at the front face.

F. "Ideal" Image Displacement and Image Reconstruction

Figure 18:
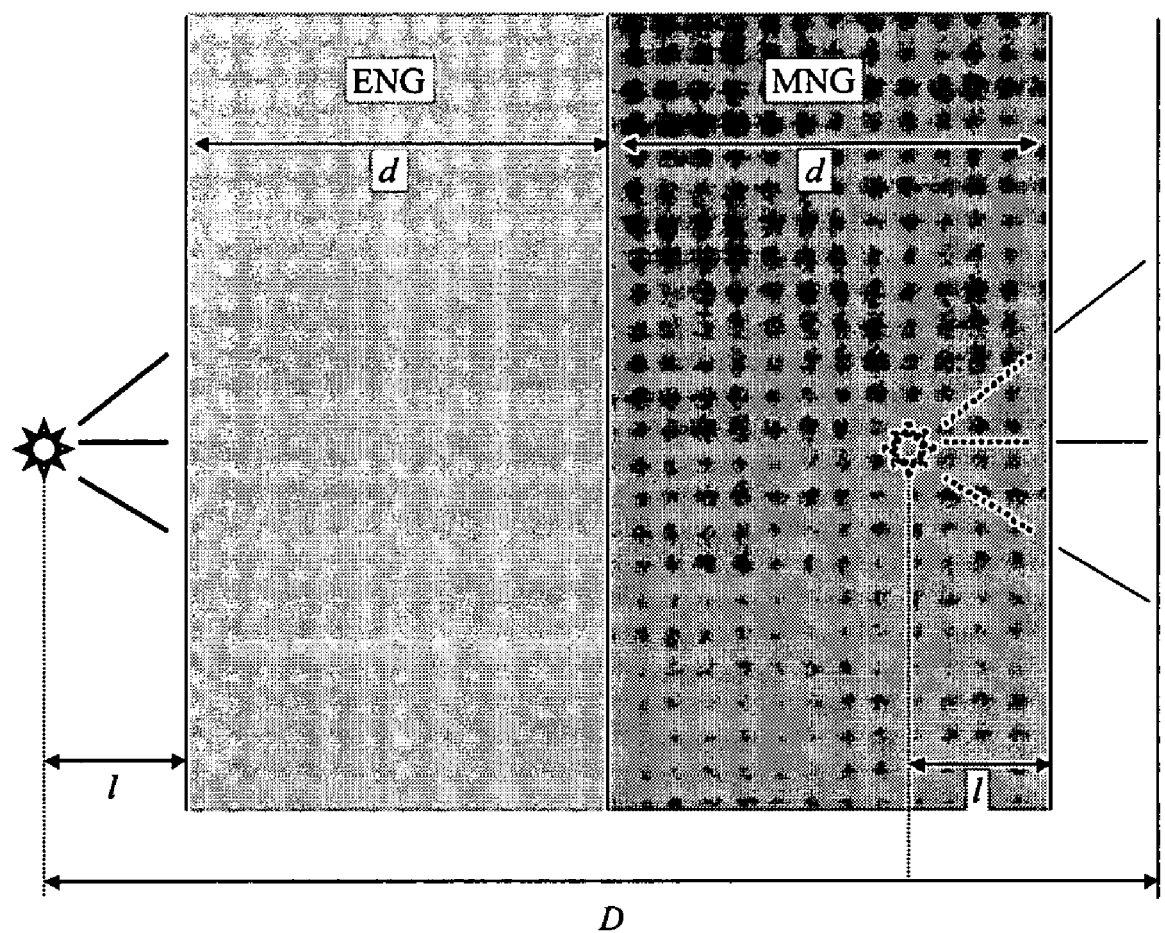
FIG. 18 illustrates a conceptual idea for the image displacement and image reconstruction with conceptually all the spatial Fourier components preserved using the concept of conjugate matched ENG-MNG paired slabs.

In this section, a pair of lossless ENG-MNG slabs that are conjugate matched for a given fixed frequency will be considered. In front of this pair, the inventors put an object, e.g., a line source as shown in FIG. 18. The field distribution at the object plane can in general be expanded in terms of spatial Fourier components with spatial wavenumber parameters $k_x$ and $k_y$. Here, for the sake of simplicity, it is assumed that the object is independent of the y coordinate and has a 1-D Fourier expansion in terms of spatial components with wavenumber $k_x$ only, where $-\infty < k_x < +\infty$. Since the lossless ENG-MNG pair is conjugate matched, each of the spatial Fourier components, propagating as well as evanescent waves in the outside region, will in principle tunnel through the pair, and they show up at the exit face with the same corresponding values as their values at the entrance face. This means that an observer on the back side of the paired slab will see the object as though it were displaced and seated closer to the observer by the amount $d_1 + d_2$. In fact, conceptually all of its spatial Fourier components are preserved. In the absence of the ENG-MNG pair, if the distance between the object and the observer is assumed to be D, the observer for large enough D will only receive the propagating waves from the object, and the evanescent wave portion of the Fourier decomposition will be negligible at the observation plane. However, if the conjugate matched lossless ENG-MNG pair is inserted in the region between the object and the observer, the apparent location of the object will be at the distance D−2d, which may provide near-field observation of the objects with theoretically all spatial Fourier components (propagating and evanescent components in the outside region) present, i.e., with its original resolution intact. This can provide an interesting application of such paired slabs in image reconstruction and resolution enhancement.

Also, an analogous matched pair of lossless DPS-DNG slabs would also "preserve", and allow "tunneling", of the evanescent waves as they interact with such a pair, similar to what Pendry has analyzed for a DNG slab surrounded by a DPS medium. However, unlike the case of an ENG-MNG pair, propagating waves can exist in the DPS-DNG pair, and owing to the anomalous negative refraction at the interfaces between DNG and DPS materials, a focusing effect occurs leading to a real image. Such a focusing effect for a DNG slab has already been suggested and studied by Pendry in the particular case in which the DPS slab material is taken to be the same as the outside region, i.e., free space. In general, for a DPS-DNG pair a real image of an object can be formed, whereas for an ENG-MNG pair, a virtual image can be obtained. This behavior is illustrated in FIG. 18. As illustrated in FIG. 18, when such a pair of ENG-MNG slabs is inserted between the object (on the left) and the observer (on the right), that is, at a distance D away from the object, the virtual image of the object appears closer to the observer, at the distance D−2d, with ideally all its spatial Fourier components present, i.e., with its original resolution intact. Those skilled in the art will appreciate that this technique permits displacement of an image whereby near field imaging may be accomplished even though an imaging probe is placed further away from the object of interest, assuming that the ENG-MNG layers are transparent.

Although implementations of the invention have been described in detail above, those skilled in the art will readily appreciate that many additional modifications are possible without materially departing from the novel teachings and advantages of the invention. For example, those skilled in the art will appreciate other possible applications of this invention including possible use in design of stealthy objects, miniaturization of cavities and waveguides and related devices and components, in design of thin Fabry-Perot technology, and reduction of reflection in solar energy transducers, to name a few. Any such modifications are intended to be included within the scope of the invention as defined in the following claims.

What is claimed is:

1. A structure for use in waveguiding or scattering of waves, the structure comprising first and second adjacent layers, the first layer comprising an epsilon-negative (ENG) material or a mu-negative (MNG) material, and the second layer comprising either (1) a double-positive (DPS) material, (2) a double-negative (DNG) material, (3) an ENG material when said first layer is an MNG material, or (4) a MNG material when said first layer is an ENG material.

2. The structure of claim 1, wherein the first and second layers are parallel so as to form a waveguide.

3. The structure of claim 2, wherein said first and second layers are bounded by metal plates in a direction parallel to a propagation direction of a guided wave whereby said waveguide is a closed waveguide.

4. The structure of claim 3, wherein the first layer has a thickness $d_1$, permittivity $\epsilon_1$, and permeability $\mu_1$, and the second layer has a thickness $d_2$, permittivity $\epsilon_2$, and permeability $\mu_2$, whereby if the thicknesses $d_1$ and $d_2$ are assumed to be very small in a direction perpendicular to the propagation direction of the guided wave and the parameters $\mu_1$, $\mu_2$, $\epsilon_1$, $\epsilon_2$ satisfy the following equations:

$$\gamma \Box - \frac{\mu_2}{\mu_1} \text{ for TE mode, and}$$

$$\beta_{TM} \Box \pm \omega \sqrt{\frac{\mu_1 \gamma + \mu_2}{\gamma/\epsilon_1 + 1/\epsilon_2}} \text{ for TM mode,}$$

where $\gamma$ is defined as $d_1/d_2$ and $\beta_{TM}$ is a wave number in a TM mode that depends on the ratio of layer thicknesses, $d_1/d_2$, not on the total thickness ($d_1+d_2$), then the TM and TE modes have no cut-off thickness below which the TE mode may not propagate.

5. The structure of claim 4, wherein at $\beta=0$ $d_1$ and $d_2$ are selected such that $d_1/d_2 \approx -\mu_2/\mu_1$, thereby forming a cavity resonator in said closed waveguide that is independent of $d_1+d_2$.

6. The structure of claim 2, wherein the first layer comprises said ENG material, said ENG material having a thickness $d_1$, and the second layer comprises said MNG material, MNG material having a thickness $d_2$, and wherein said structure provides a single mode when $d_1$ and $d_2$ are selected to be multiples of a wavelength of a guided wave whereby the single mode is effectively independent of a value of $d_1+d_2$.

7. The structure of claim 1, wherein the first and second layers are concentrically disposed with respect to each other in a direction parallel to a propagation direction of a guided wave.

8. The structure of claim 1, wherein the first layer comprises said ENG material, said ENG material having a thickness $d_1$, an equivalent transverse impedance $X_{ENG}$, and an effective longitudinal wave number $\beta_{ENG}$, and the second layer comprises said MNG material, said MNG material having a thickness $d_2$, an equivalent transverse impedance $X_{MNG}$, and an effective longitudinal wave number $\beta_{MNG}$, whereby the structure exhibits approximately zero reflection and tunneling if regions outside said ENG and MNG materials are the same and if $X_{ENG}=-X_{MNG}$ and $\beta_{ENG}d_1=\beta_{MNG}d_2$.

9. The structure of claim 8, wherein the first layer has a permittivity $\epsilon_1$ and a permeability $\mu_1$ and the second layer has a permittivity $\epsilon_2$ and a permeability $\mu_2$, where $\epsilon_1=-\epsilon_2$ $\mu_1=-\mu_2$, and $d_1=d_2$ whereby the structure exhibits zero-reflection and tunneling through the first and second layers for any incident wave at any angle of incidence and for any polarization.

10. A method of providing image displacement of an object for near-field observation using the structure of claim 9, comprising the steps of placing the structure of claim 9 between the object and an observer and observing evanescent waves that have tunneled through the structure, whereby when the object and observer are separated by a distance D, the object is displaced toward the observer by the distance D−($d_1+d_2$).

* * * * *